(12) United States Patent
Roediger

(10) Patent No.: US 7,711,670 B2
(45) Date of Patent: May 4, 2010

(54) AGENT ENGINE

(75) Inventor: Karl Christian (Chris) Roediger, Ra'anana (IL)

(73) Assignee: SAP AG, Walldorf (DE)

( * ) Notice: Subject to any disclaimer, the term of this patent is extended or adjusted under 35 U.S.C. 154(b) by 966 days.

(21) Appl. No.: 10/328,855

(22) Filed: Dec. 24, 2002

(65) Prior Publication Data
US 2004/0098358 A1   May 20, 2004

Related U.S. Application Data

(60) Provisional application No. 60/426,246, filed on Nov. 13, 2002.

(51) Int. Cl.
*G06N 5/02* (2006.01)
(52) U.S. Cl. .................. 706/46; 717/104; 717/106; 717/163
(58) Field of Classification Search ............... 706/46; 717/104, 106, 163
See application file for complete search history.

(56) References Cited

U.S. PATENT DOCUMENTS

| | | | | |
|---|---|---|---|---|
| 5,586,218 A | * | 12/1996 | Allen | 706/12 |
| 5,918,210 A | * | 6/1999 | Rosenthal et al. | 705/7 |
| 6,314,555 B1 | * | 11/2001 | Ndumu et al. | 717/101 |
| 6,449,603 B1 | | 9/2002 | Hunter | |
| 6,738,757 B1 | * | 5/2004 | Wynne et al. | 707/3 |
| 6,741,974 B1 | * | 5/2004 | Harrison et al. | 706/47 |
| 6,847,854 B2 | * | 1/2005 | Discenzo | 700/99 |
| 6,965,886 B2 | * | 11/2005 | Govrin et al. | 706/45 |
| 2002/0147632 A1 | * | 10/2002 | Winham et al. | 705/11 |
| 2003/0187675 A1 | * | 10/2003 | Hack et al. | 705/1 |
| 2004/0215710 A1 | * | 10/2004 | Awe et al. | 709/202 |

FOREIGN PATENT DOCUMENTS

WO    WO 01/09831    2/2001

OTHER PUBLICATIONS

"Fuzzy Logic", Lofti A. Zadeh, University of California, Berkeley, IEEE, Apr. 1988.*
"A Business Intelligence System", H. P. Luhn, IBM Journal, Oct. 1958.*
"A Proposed Framework for Intelligent Systems Based on Multi-Agent Conception", Zheng Yang; Tu Renshou; Xiong Fanlun; Intelligent Processing Systems, 1997. ICIPS '97. 1997 IEEE International Conference on vol. 1, Oct. 28-31, 1997 pp. 923-927.*
"Application of Development Method Based on Multi_Agents", Shuzhen Yao; Shenghua Geng; Yufeng Liu; Technology of Object-Oriented Languages and Systems, 2000. Tools—Asia 2000. Proceedings. 36th International Conference on Oct. 30-Nov. 4, 2000 pp. 158-161.*

(Continued)

*Primary Examiner*—Donald Sparks
*Assistant Examiner*—Mai T Tran
(74) *Attorney, Agent, or Firm*—Blakely, Sokoloff, Taylor & Zafman, LLP

(57) ABSTRACT

An agent engine includes a definition process, the definition process operable to define a data set associated with an objective, a library storing a set of components, the components comprising at least one of a pre-programmed application, object, algorithm, function, and data set definition, and an agent generator process, the agent generator process operable to define at least one agent that includes at least one component from the library, the at least one generated agent defined to perform a function related to the objective.

34 Claims, 25 Drawing Sheets

OTHER PUBLICATIONS

"Multiagent Systems Engineering", Scott A. DeLoach, Mark F. Wood and Clint H. Sparkman, The International Journal of Software Engineering and Knowledge Engineering, vol. 11 No. 3, Jun. 2001.*

"Key Performance Indicators", Wikipedia, http://en.wikipedia.org/wiki/Key_performance_indicators.*

"KPI", webopedia, http://isp.webopedia.com/TERM/K/KPI.html.*

Silicon Valley World Internet Center, "Artificial Intelligence (AI): Is it real? AI and Supply Chain Management, An Introduction to Adaptive Logic Networks With an Application to Audit Risk Assessment," Nov. 13, 2001, Silicon Valley World Internet Center Proceedings (http://www.worldinternetcenter.com/Publications/proceedings.html).

Coggor, Kenneth O.; Fanning, Kurt, "An Introduction to Adaptive Logic Networks With an Application to Audit Risk Assessment," Aug. 1997, Presentation at American Accounting Association, Dallas, TX.

Werfel, Justin; Mitchell, Melanie; Crutchfield, James P., "Resource Sharing and Coevolution in Evolving Cellular Automata," Nov. 2000, IEEE Transactions on Evolutionary Computation, vol. 4, No. 4.

Lawrence, F. Barry, "Distribution and Information Technology," Mar. 1, 2001, National Association of Wholesalers, Chicago, IL.

Bagchi, Sugato et al., "Experience Using the IBM Supply Chain Simulator," Dec. 1998, Proceedings of the 1998 Winter Simulation Conference (pp. 1387-1394).

Klein, Mark et al., "Negotiating Complex Contracts," Mar. 2003, Group Decision and Negotiation, vol. 12, No. 2, pp. 111-125 (15), Kluwer Academic Publishers, Dordrecht, The Netherlands, http://ccs.mit.edu/klein/papers/gdn-02.pdf.

Technical University of Munich, Germany, "Algorithms", document creation date Jun. 5, 2001, Chapter 5, pp. 5.1-5.24, http://www.st.bv.tum.de/english/Teaching/StructOpt/SO_5_Algorithms.pdf.

Klein, Mark et al., "What Complex Systems Research Can Teach Us About Collaborative Design," Jul. 12-14, 2001, Proceedings of the Sixth International Conference on Computer Supported Cooperative Work in Design (CSCWD-2001), IEEE Press.

Bar Yam, Y., "Neural Networks I: Subdivision and Heirarchy," Aug. 1997, Chapter 2, Dynamics of complex systems, Addison-Wesley Publishers.

Bar Yam, Y., "Neural Networks II: Models of Mind," Aug. 1997, Chapter 3, Dynamics of complex systems, Addison-Wesley Publishers.

Denaro, Daniele, "Neural Networks Management Library," Feb. 2002, Napier University School of Computing 10 Colinton Road, Edinburgh EH10 5DT (UK).

Nelson II, Sigurd A., "Distributed Design and Hierarchical Optimization," Jun. 3-4, 1997, Distributed Design and Heirarchical NLP, ARC Conference, Ann Arbor, MI.

Murdock, J. William, "Self-Improvement through Self-Understanding, Model Based Reflection for Agent Adaptation," Jul. 2001, Georgia Institute of Technology, Ph.D. Thesis.

Inmon, W.H., "Distributed Metadata: Gluing the DSS Data Warehouse Environment Together" 1997, Pine Cone Systems, Inc., Tech Topic 18 Letter.

Joanna Filipek and Marko Fabiunke, *XMI based UML processing in KobrA*, (Position Paper), Institute for Computer Architecture and Software Technology German National Research Center for Information Technology, Apr. 2, 2001, XP002284180, Retrieved from the Internet ,<URL:http://ase.arc.nasa.gov/wtum101/submissions/filipek-fabiunke.pdf>, Paragraphs [0001]-[0004].

The E-Development Company, *Rational Rose RealTime*, 2000, XP002284181, Retrieved from the Internet: <URL:http://www.ghs.com/partners/rational/rose-rt.pdf>, the whole document.

Harry Wechsler and David Rine, *Object Oriented Programming (OOP) and its Relevance to Designing Intelligent Software Systems*, Proceedings of the International Conference on Computer Languages, Miami Beach, Florida, Oct. 9-13, 1988, Washington, IEEE, Department of Computer Science, George Mason University, pp. 242-248, XP00013619.

Fabio Bellifemine, et al., *Developing mulii-agent systems witha FIPA-compliant agent framework*, Software-Practice and Experience, John Wiley & Sons, Ltd., Feb. 2001, vol. 31, No. 2, pp. 103-128, XP000987538.

Hamid R. Berenji and Sujit K. Saraf, *Competition and Collaboration among Fuzzy Reinforcement Learning Agents*, Fuzzy Systems Proceedings, 1998, IEEE World Congress on Computational Intelligence, The 1998 IEEE International Conference on Anchorage, May 4, 1998, pp. 622-627, XP010287575.

V. Cote and R. St.-Denis, *Bridging the Gap Between Case Tools and Project Management Through a Decision Support System Based on Metrics*, 1992, Department de Mathematiques et d' Informatique, Universite de Sherbrooke, Quebec, Canada, pp. 300-309.

Tom Williams, *Neural, fuzzy methods combine for embedded code generation*, May 1993, Computer Design, 32 May 1993, No. 5, Tulsa, OK.

Rational Software Corporation, *Rational Quality Architect*, User's Guide, 2001, Version 2002.05.00, Part No. 800-025138-000, pp. 1-145.

European Patent Office, Communication Pursuant to Article 94(3) EPC, dated Feb. 16, 2009, 7pgs.

Rational Software Corporation, Toolset Guide, Version: 2002.05.00, Part No. 800-025116-000, 1993-2001, 48 pgs.

* cited by examiner

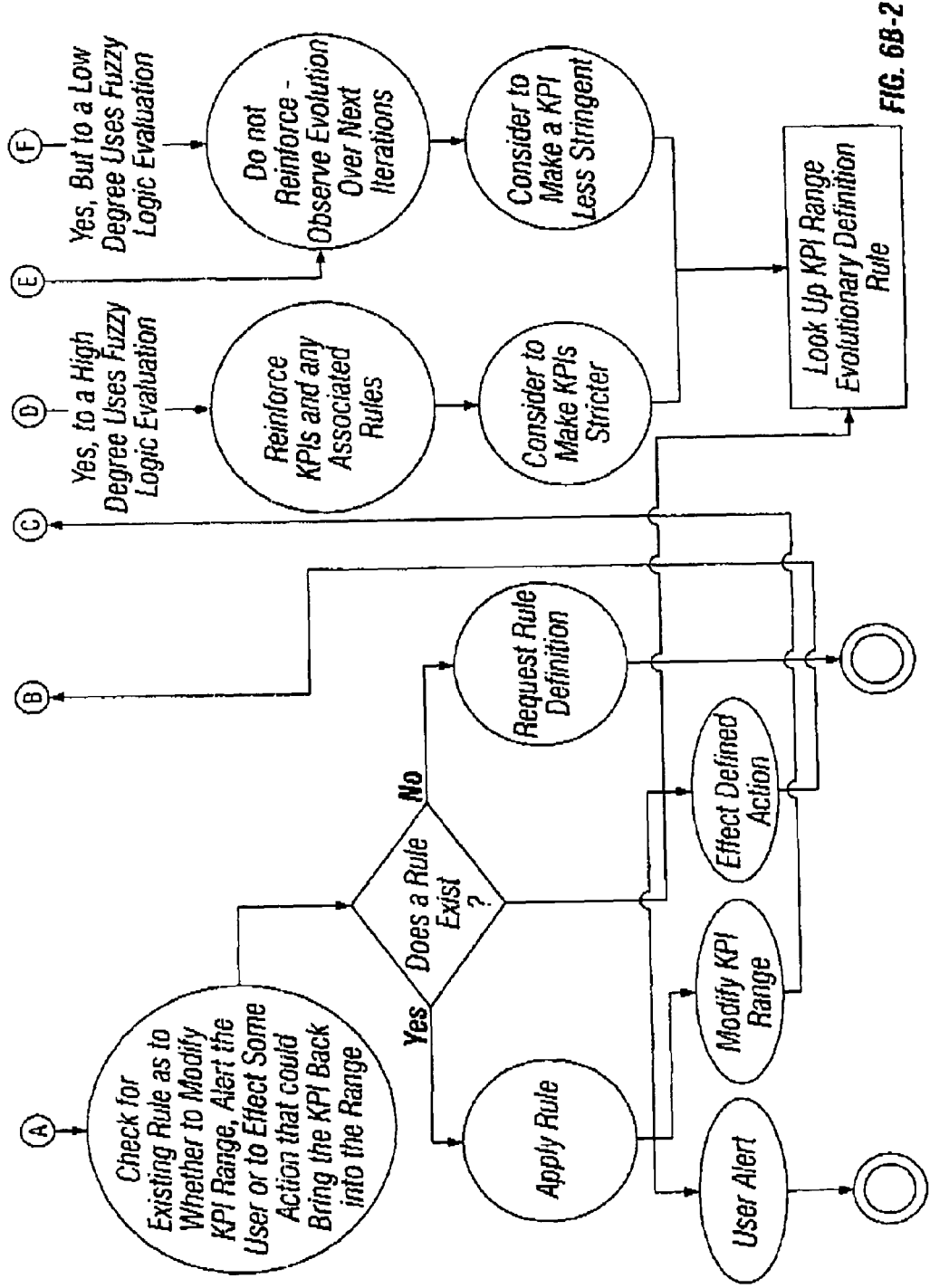

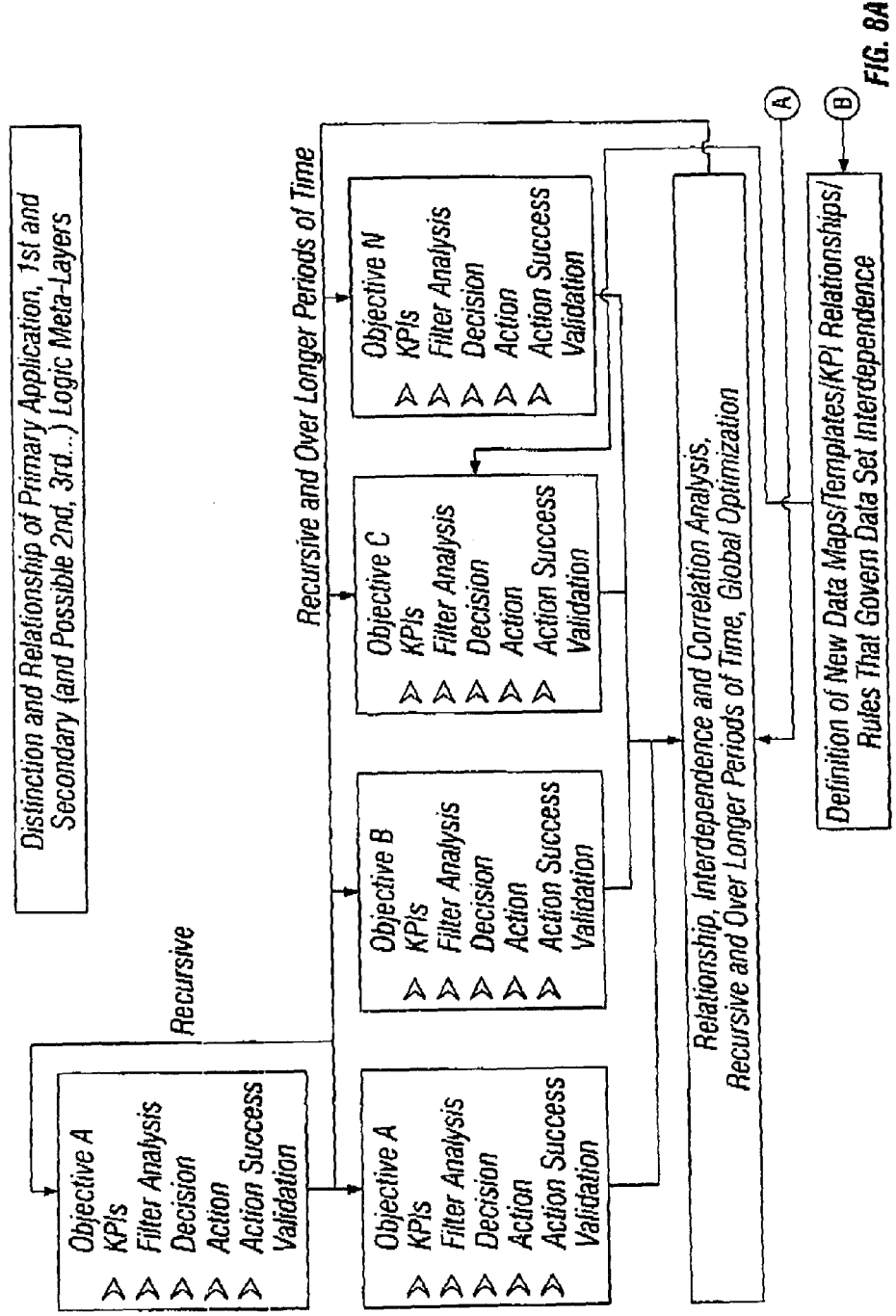

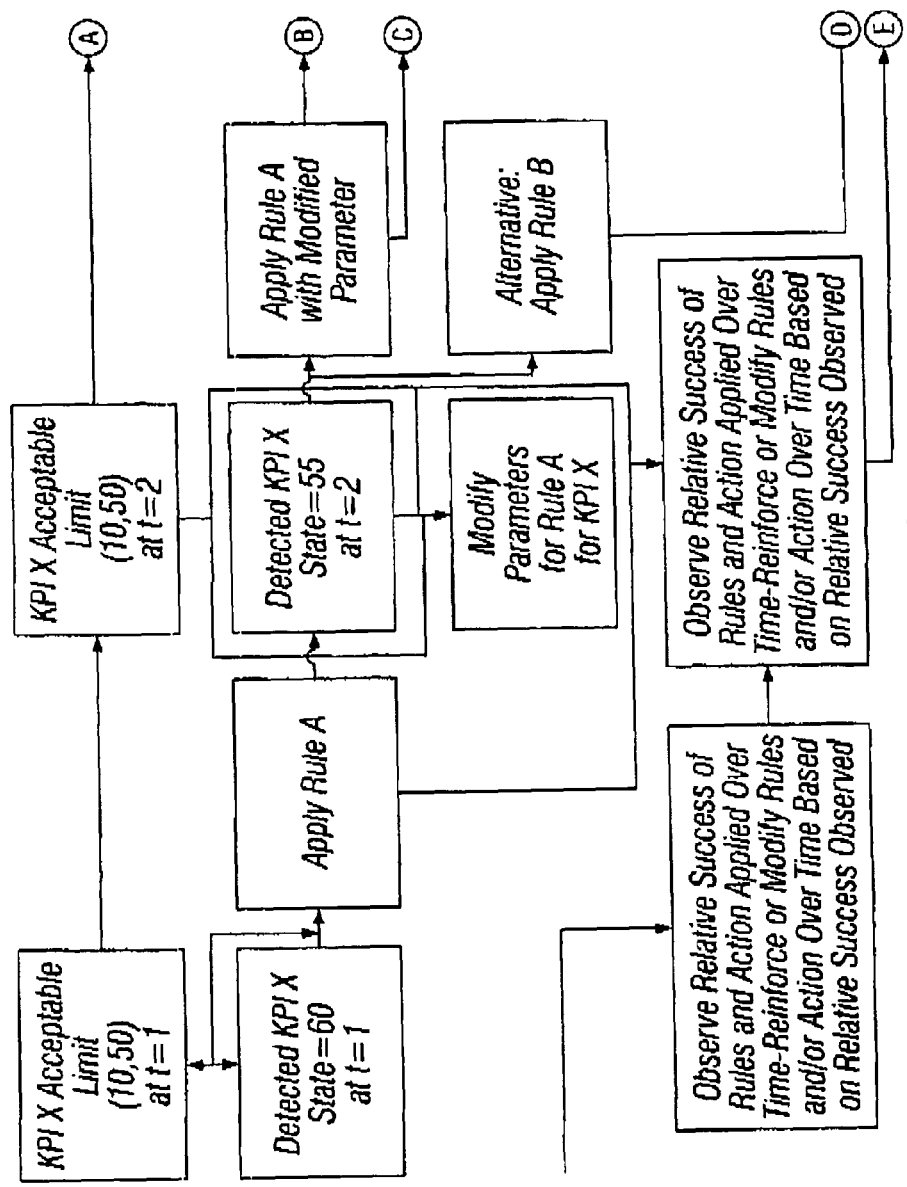

AGENT ENGINE

CROSS REFERENCE TO RELATED APPLICATIONS

This application claims priority from U.S. Provisional Application Ser. No. 60/426,246, filed on Nov. 13, 2002, which is incorporated herein by reference in its entirety.

FIELD OF THE INVENTION

The description relates to the field of computer science.

BACKGROUND OF THE INVENTION

An agent (a "proxy") refers to a set of code executable by a computer processor that may be used to perform one or more specific function(s) and also to learn from the agent's performance of those functions. Learning refers to a capability included in the agent that may be used to determine whether improvements may be made to the agent when performing subsequent actions.

Typically, the generation of an agent is performed manually, by a programmer. The programmer is given a set of input and output criteria and then creates the agent program to perform the specified functions (e.g. corresponding to the input/output criteria).

SUMMARY OF THE INVENTION

According to an aspect of this invention, an agent engine includes a definition process, the definition process operable to define a data set associated with an objective, a library storing a set of components, the components comprising at least one of a pre-programmed application, object, algorithm, function, and data set definition, and an agent generator process, the agent generator process operable to define at least one agent that includes at least one component from the library, the at least one generated agent defined to perform a function related to the objective.

Described herein is an agent engine (AE) process and/or system that includes a configurable software architecture that may be used to achieve an objective. For example, the objective may be related to the analysis of data related to a function of a business entity, government entity, military entity, etc. The AE process may include one or more generated agents that are usable to perform different functions necessary to accomplish the business objective.

As used herein, the term "Key Performance Indicator" (KPI) refers to a performance indicator (e.g., a value, or range of values) of a data set. A KPI may also be used to determine performance of a generated agent(s) based upon an output of the generated agent, for example, to determine a possible modification to a generated agent to improve subsequent performance of the agent.

As used herein, the terms "Objectives" or "Business Objectives" may be used interchangeably. Objectives refer to a task or goal the AE is expected to achieve. "Domain" may refer to an objective or refer to a broader category of an objective. Exemplary objectives and domains include, but are not limited to, business, intelligence, decision-support, information needed and/or performance objectives. At times, objectives are referred to as business objectives in order to facilitate the illustration of examples.

Unless otherwise defined, all technical and scientific terms used herein have the same meaning as commonly understood by one of ordinary skill in the art to which this invention belongs. Although methods and materials similar or equivalent to those described herein may be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

BRIEF DESCRIPTION OF THE DRAWINGS

FIGS. 6a and 6b-2 show embodiments of an Agent Engine architecture;

FIGS. 8a and 8b shows components of an embodiment of an Agent Engine;

FIGS. 9a, 9b, 10a, 10b-1 and 10b-2 depict exemplary processes that may be included in an embodiment of an Agent Engine;

DETAILED DESCRIPTION

Figure 1:
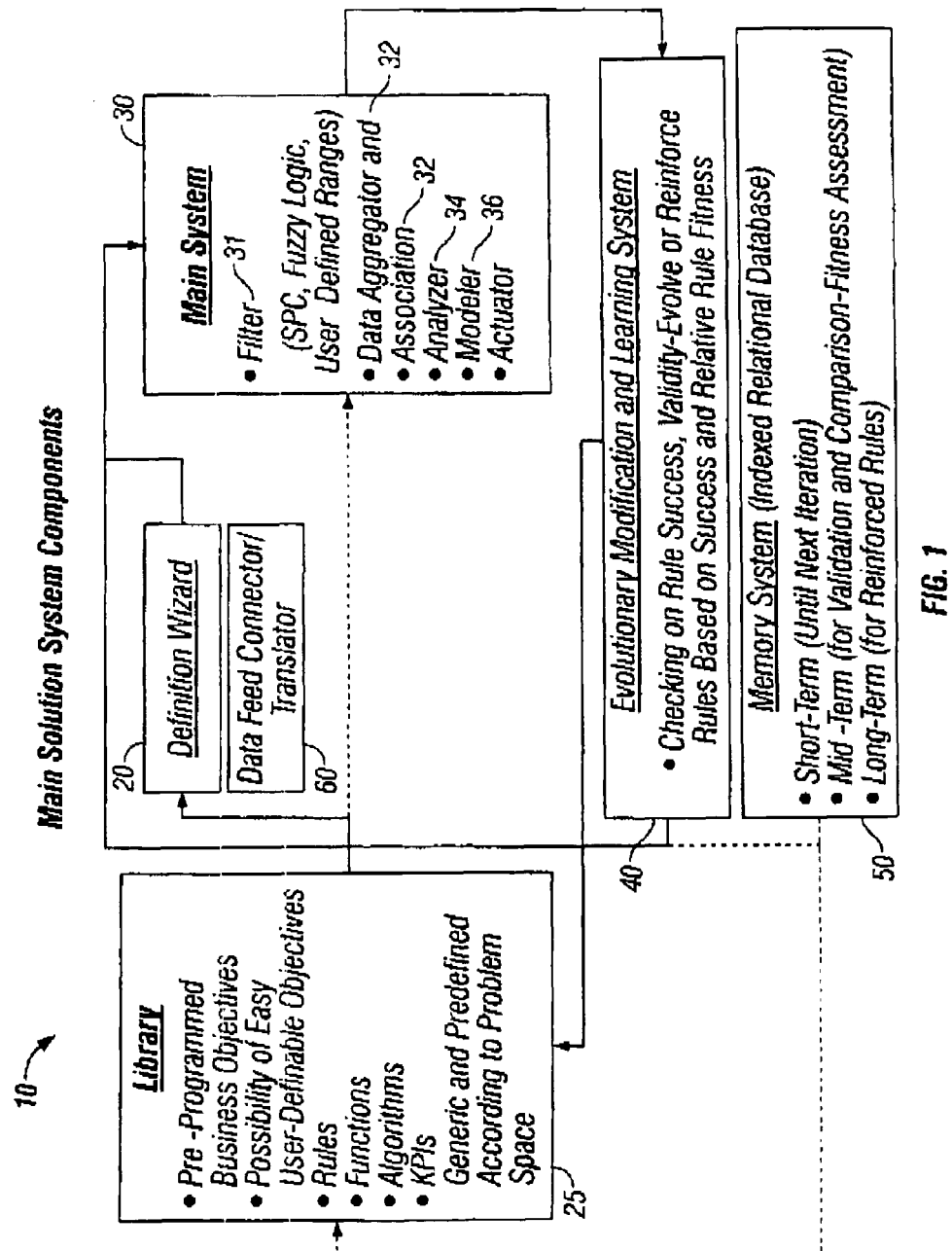
FIG. 1 shows an embodiment of an Agent Engine

FIG. 1 shows an embodiment of an agent engine 10 (AE) that may be used to generate agents configured to perform one or more functions on defined data sets to produce output data related to a business objective. In one embodiment, agent engine 10 provides a multiple-level architecture that provides a relatively simple mechanism for a user to generate an agent driven process that may be used to evaluate a specific business objective. Agent engine 10 includes a library 25 of pre-defined "building blocks" (e.g., executable code, rule-based filters, object-oriented programs, etc.) that agent engine 10 may use to configure generated agents. The generated agents output by agent engine 10 may be performed (e.g., executed) to produce outputs (e.g., results) that are consistent with and useful to solve a user's business objective. The agent engine may be used to generate agents based upon the inputs of the user or business entity, e.g., a business objective, a set of data inputs and/or desired outputs.

In an embodiment, each generated agent is implemented such that the generated agent may be performed autonomously, e.g., without requiring intervention and/or commands from another process or agent to start, stop and/or control execution of the generated agent.

In one embodiment, agent engine 10 includes a multiple-layer architecture, where each layer may include one or more generated agent(s) to perform specific function(s) related to the business objective. Therefore, the multiple level architecture allows for multiple-level learning. Also, in an embodiment of the multiple-layer architecture, data and/or a command may be passed from one level to the next level. The data and/or the commands passed from a first level to a second level may be usable by the learning code included in the second level agent, etc.

In one general aspect, an agent engine refers to an architecture that may be customized to be domain specific through the definition of objectives, rules, KPIs, or using function calls that relate a generated agent to a single or distributed external system. In another general aspect, an AE may perform so-called intelligent (e.g., learning) performance monitoring of distributed information systems.

In yet another general aspect, an AE may be implemented as an application that is domain independent and may include intelligent analytical cognitive capabilities that are determined by recursive sensing and parameter and rule evolution. The AE may be used to provide a multi-purpose logic platform for local and/or global business, organizational and/or system performance monitoring, problem analysis, optimization and automated decision-making or decision support. The AE may cross-index operational, business process, tactical and strategic data for improvements, decision-making, and effecting operational rule changes or prompting action(s). The AE may learn cause and effect relationships through correlation and causal analysis for subsequent impact analysis and rule reinforcement or modification and/or user alert. The AE may learn how to adapt rules (e.g., values or ranges of values) or the applicability (fitness) of certain rules. The AE may also be used to discover "hidden" interdependencies that exist between information, thereby allowing the AE to make better associations, analyses and decisions. The AE may also include the capability to gauge the success of an evolved agent and/or set of rules and may also include the capability of determining potential problems such as local optimization versus global optimization at discrete time intervals.

Exemplary uses of the AE include providing data outputs and/or analysis to a user, monitoring performance of generated agents, issuing alerts and/or effecting actions, and linking to other programs such as CRM, CRM Analytics, SCM, SCM Analytics, ERP systems, and BW systems.

Architecture of the AE

FIG. 1 depicts an embodiment of an agent engine process 10. Agent engine 10 includes a definition wizard process 20 used to generate an agent process for a received business objective. Definition wizard process 20 may also include an interface sub-process (not shown) that may be used to relate data outputs from one agent to another agent in those cases where multiple agents are generated to achieve a business objective. In the embodiment depicted in FIG. 1, agent engine 10 includes a library 25 of functional components usable to generate an agent process, e.g., the library may include pre-defined rules, algorithms, KPIs, objects and business objectives. In operation, wizard process 20 may include one or more library 110 components in an agent process to achieve the received business objective. Agent engine 10 also includes data feed connector process 60 that may be used to define an input data set for a generated agent.

In this embodiment agent engine 10 also includes three sub-processes, 30, 40 and 50 that are used to execute, modify/learn, and store results, respectively, from the agent(s) generated by wizard process 20. In more detail, main sub-process 30 may include a filter algorithm 31 to contextualize, route, filter, and/or compare data inputs to KPIs and associated objectives. Main sub-process 30 may also include sensors (not shown) for sensing and translating data feeds to a generated agent. Main sub-process 30 may also include a data aggregator and association (32) for aggregating and correlating data. Main sub-process 30 may also include an analyzer 34 for analyzing data, and a modeler 36 for improving data and/or rules. In more detail, main sub-process 30 may perform actions that improve (e.g., modify) rules performed by a generated agent. However, please realize that the AE may operate in a recursive and evolutionary manner, e.g., where rules and/or data set definitions are modified at several levels of the AE architecture. Main sub-process 30 typically performs actions to evaluate (e.g., learn) rules and rule parameters that are predefined and/or evolved such as certain action rules that are may change in reponse to detected data criteria. The modification capability of the AE system may perform actions to modify these defined rules based on an analysis of data outputs from previous iteration(s).

Figure 2A:
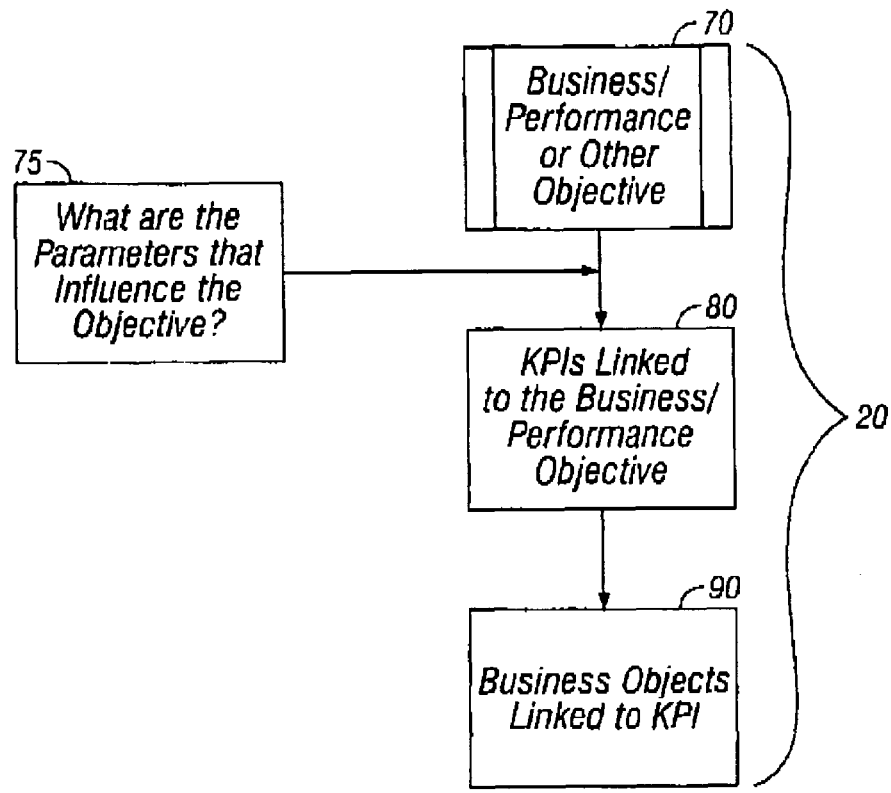
FIG. 2a shows an embodiment of a wizard process.

FIG. 2a depicts definition wizard process 20 that may be used to generate agent process(es) for a business objective. Process 20 includes receiving (70) a business objective, linking(80) a KPI from library 25 to the business objective, and linking (90) an executable code segment (e.g., a pre-defined object, function, or algorithm from library 25) to the KPI. Process 20 may be repeated multiple times to produce multiple agents, each agent for performing specific functions related to a business objective. Process 20 may also include determining (75) a parameter(s) associated with the received business objective, the parameter usable to determine an appropriate KPI and/or business object of a generated agent.

Figure 2B:
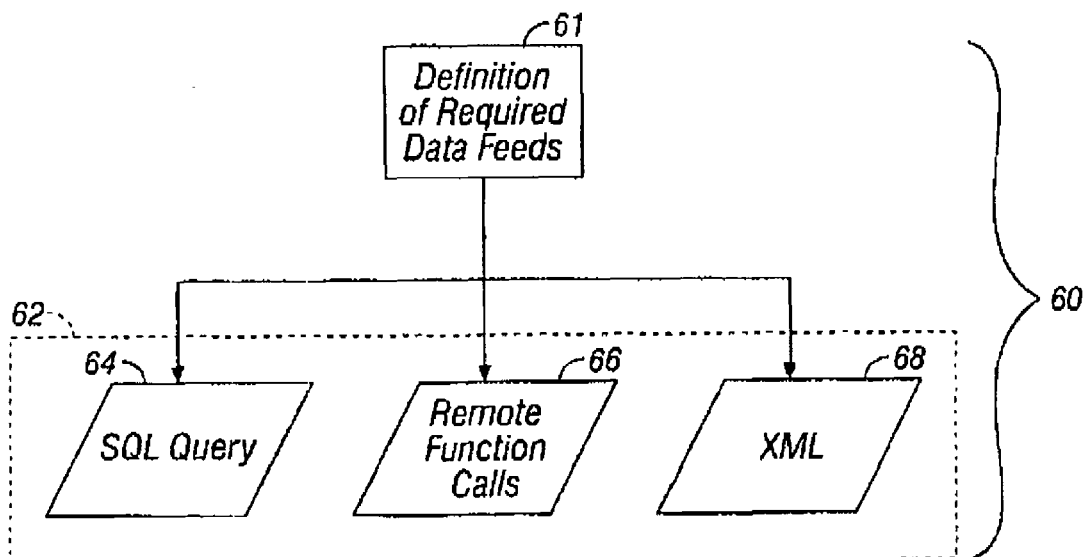
FIG. 2b shows an embodiment of a data connector process.

FIG. 2b depicts data feed connector process 60 that may be used to define an input data set for an agent generated by wizard process 20. Data feed connector process 60 includes defining (61) an input data set for the received business objective, or related to a linked object. Defining (61) may include selecting among a set of pre-defined data set definitions (62) and/or applications, such as an SQL query (64), a remote function call (66) and/or a XML document (68).

Figure 3A:
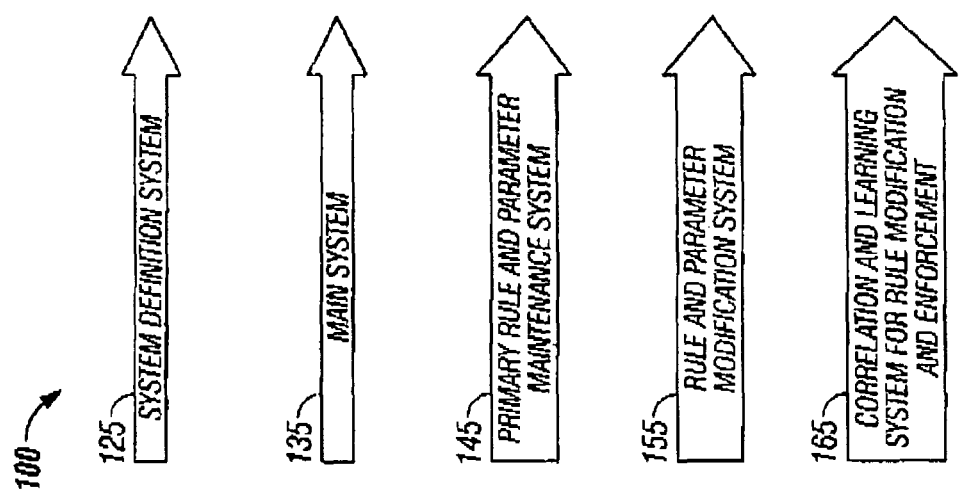
FIGS. 3a and 3b shows embodiments of an Agent Engine.
Figure 3B:
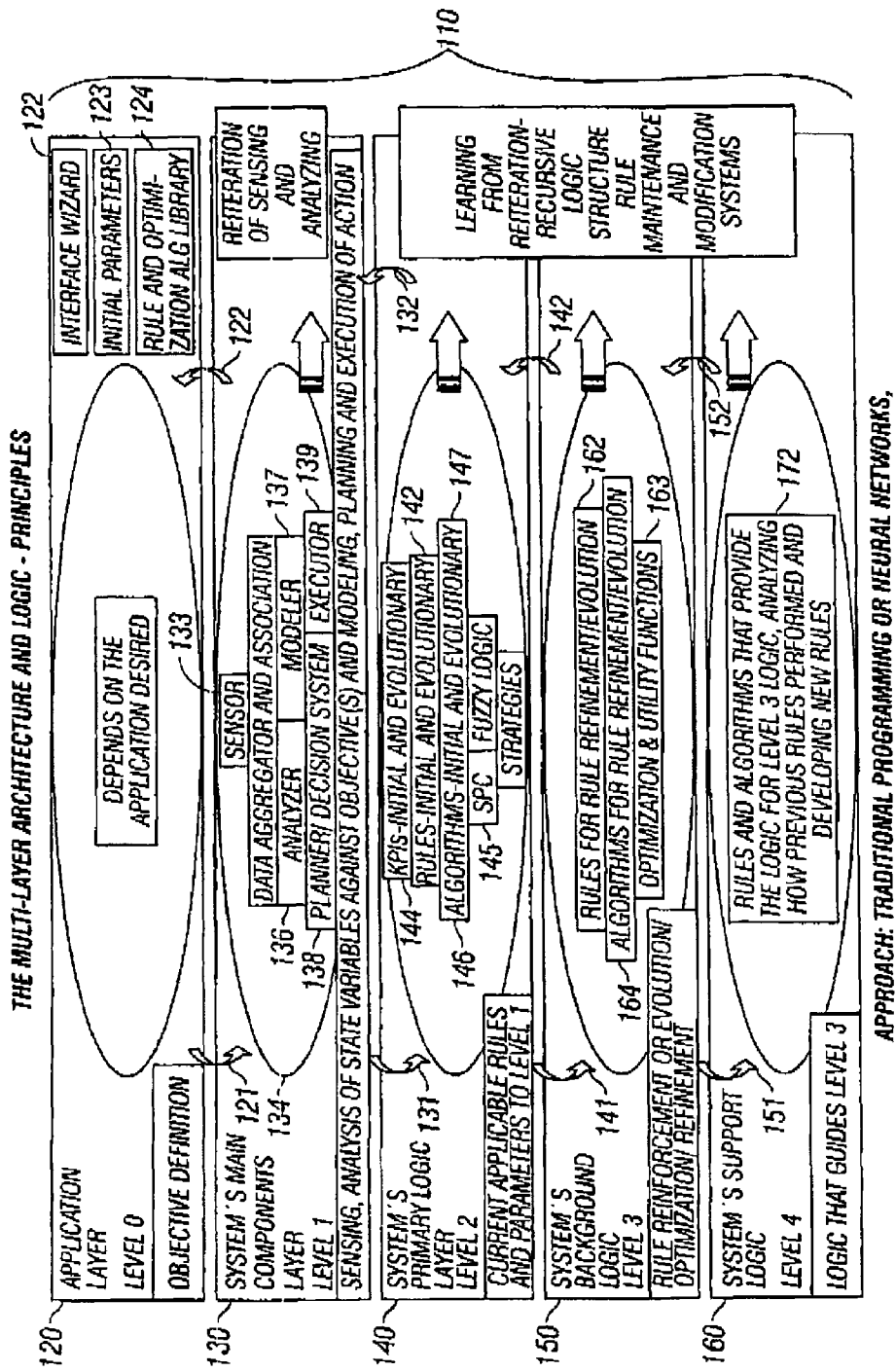

FIGS. 3-3a and 3b depicts one embodiment of an agent engine 100 that includes a multi-layered architecture 110 that may be performed to achieve a business objective for a user or business entity. Each layer 120, 130, 140, 150 and 160 may include one or more of an agent generation action, an agent execution and/or an execution of a learning process. Multi-layered architecture 110 also includes one or more data feeds 121, 122, 131, 132, 141, 142, 151, and 152, that depict the possible passing of data and/or a command from a first agent in a first layer to a second agent in a second layer of architecture 110. The passed data and/or command is usable by the second agent, or usable to determine rule modifications, for example. Data feeds 121, 122, 131, 132, 141, 142, 151 and 152 may represent an application programming interface, or "API".

In an embodiment, process 20 may generate and link multiple agents for an AE system. For example, process 20 may generate single agents for a first level in an AE architecture that interact with single or multiple agents at another functional level in the AE architecture. In this case, the AE architecture may implemented to generate and execute many agents (at least one agent at each level) that each interact with another agent in a defined and evolutionary relationship. In another embodiment, a single agent may be generated that incorporates the functions of at least two levels in an AE engine.

A first layer (or level) 120 of agent engine 100 is referred to as an Application Layer 125 (also referred to as a "System Definition Layer"). At this level, the business objective, i.e., the question to be answered, is received (and/or defined). Also at this level, an initial set of parameters are received (and/or determined) and the wizard process 20 is executed to define any KPIs, objects and rules for the generated agent(s). Application layer 125 may include a definition wizard sub-process 20 (see FIG. 2a), an interface wizard sub-process (122) that may relate data outputs from one agent to another agent in those cases where multiple agents are generated to achieve a business objective. Process Wizard process (122) may assist in definition of the objective and the customization of the KPIs, rules, and parameters. First layer 120 may also include a Rule and Optimization library 124.

A second layer 130 of agent engine 100 may be referred to as a Main System layer 135. Main system layer 135 may include sensors 133 for sensing and translating data feeds. Main system layer 135 may also include a data aggregator and associator 134 for aggregating and correlating data. Main system layer 135 may also include executable code to contextualize, route, filter, and/or compare sensed data inputs to KPIs and objectives, an analyzer 136 to analyze data, and a modeler 137 to modify/improve rules. Main system layer 135 may also include a planner/decision component 138 to determine an execution action, and an executor 139 to cause execution of one or more generated agents. (Please realize that agent engine 100 is based, in part, or continued feedback and improvement to generated agent(s) based on the feedback). Therefore, generated agents produced by agent engine 100 may be performed multiple times so that feedback (e.g., results) are available to determine improvements to initial generated agents.

A third layer 140 of agent engine 100 is referred to as a Primary Rule and Parameter Layer 145. This layer typically includes code that is usable to perform rule and parameter maintenance. In more detail, third layer 140 may include code to determine after one or more iterations of agent engine 100 whether sensed and/or aggregated data inputs result in performance and/or business objective values that are within predefined or evolved limit ranges (the data inputs may be generated during processing in "real-time", by batch, etc.) Third layer 140 may also include and use KPIs 144, rules 142, and/or algorithms 146 to determine whether modifications to a generated agent (or generated rule) is required to improve agent engine 100. Agent engine 100 may also include determining an action to take based on the determined modification(s) to the generated agent. For example, a determined action may include creating a user alert, or verification of a variance between a data input and a KPI values, (e.g., determining a variance between an expected value or value range associated with the KPI). The verification of a variance may be determined by using a program such as a fuzzy logic program 147, and/or an Statistical Process Control (SPC) program 145 (SPC refers to a statistical evaluation mechanism using standard deviation that permits statistical process analysis, e.g., permitting monitoring of KPI value evolution over time).

A fourth layer 150 of agent engine 100 may be referred to as Rule and Parameter Modification/Reinforcement Layer 155. Fourth layer 150 includes code to determine rule and parameter modifications and/or reinforcements. Layer 150 may include a rule(s) 162, algorithm 164, and/or optimization and utility functions 163 (for modification, reinforcement and/or maintenance of a generated agent). Layer 150 essentially is intended to improve upon objects included in a generated agent, and/or a KPI definition associated with a generated agent.

In an embodiment, one or more of the layers included in architecture 110 are executed in a repetitive fashion such that the functions of layer 150 may be performed using multiple sets of data outputs, thereby improving the business objective and their associated KPIs over time. Therefore, agent engine 100, and architecture 110, may be used to improve the modifications and/or reinforcement determinations over time by adapting to additional information produced by one or more generated agents. One of the key premises of agent engine 100, and/or architecture 110, is the recursive nature of the agent engine 100 process. Agent engine 100 may be considered "dynamic", e.g., by considering the changing nature of its environment (hence the need to have the capability to maintain, reinforce, modify KPIs, rules and parameters) rather than making any static assumptions. Therefore, the agent engine process 100 allows an adaptive intelligent system that includes a capability to react (e.g., modify itself) to an environment as well learn from its environment.

Agent engine 100 includes a fifth layer 160 that may be referred to as Correlation and Learning System Layer 165. Layer 160 may include rules and algorithms 172 that may be used to analyze KPIs, rules, actions, cause and effect relationships and their relative effect over time. The primary purpose of layer 160 is to identify and evaluate patterns and interdependence between applications (e.g., generated agents) of certain rules and/or actions with their associated parameters and the degree to which they are meeting initial or evolved KPI values (or value ranges). In more detail, layer 160 after identifying a correlation between applications, may pass 152 data and/or a command to instruct layer 150 to reinforce, maintain and/or modify a rule, action and/or an associated parameter according to the identified correlation.

It is contemplated that there may be additional modification and learning system layers that would create several layers of meta-meta systems. With the addition of each layer, the engine would be able to affect a deeper level of analysis and self-instructed actions. Moreover, with additional meta-logic layers, one could analyze relationships and interdependencies between different business objectives, KPIs as well as rules and actions at the lower levels of the AE—identify those and make those visible to the decision-maker and/or feed lower level layers with action parameters for the optimization of rules and parameters. It could also validate the optimality/relative fitness of lower level analysis, thus, providing an answer to the local versus global optimization problem.

Components of the AE

To effectuate the processes of the multi-layered architectural intelligent agent, the AE system may include one or more of the following, some of which are shown in FIGS. 7a, 7b, 8a, 8b, 9a, and 9b: libraries 718, a definition Wizard 712, data feed connector/translator 752, a main system 740 that may include a filter mechanism 744, data aggregation and association, analyzer 746, modeler for actions 748, and/or actuator, a multi-level meta-logic layers 760, 810, 910 for evolutionary rule maintenance and modification and learning, memory systems, and/or journal.

Libraries, for these purposes, are sources of information. These libraries may be in the form of generic templates, industry generic templates, and template Wizards for use in the AE system. The generic templates may include objectives (e.g., business objective, compare contextual information, key words, scenarios, and analyze common features to previous instances such as replicate action based on common features), KPIs (e.g., hard definition, soft definition of conditions, and/or quantitative limit range), standard rules—domain specific rules, and standard action templates. Industry generic templates may include, business objectives, KPIs, standard rules, and standard action templates. Template Wizard with libraries may include business objectives, rules (e.g., association rules, analytical rules, action rules, threshold rules, and fuzzy logic rules), data mapping rules, data association clustering rules, analysis templates, data correlation rules, algorithms, and standard Action templates. The templates of the library may be preprogrammed or programmable.

Definition Wizards are applications that may be used to assist the user in customizing any step of the AE process. The Definition Wizard, with commensurate User-interface, provides step-by-step domain application instructions to enable objective definition. In addition, Wizards may help in customizing objective to performance indicator definition, performance indicator to business object definitions, data feed definition, data association rule definition, data correlation rule definition, algorithm definition, analytical framework definition, threshold definitions (e.g., KPIs, evolutionary learning control degree handed over to AE, and threshold for automated actions and user alerts), Fuzzy Logic definitions, automated decision-making threshold definition, automated action definition, user alert definition, plain language intelligence topic definition that are mapped by way of a template down to data feeds and that are then correlated, contextualize and analyzed by the AE in order to provide alerts to user or at some stage an intelligence report with a summary as to how the AE analyzed the information so that the human reader may follow the information gathered and intelligence analysis conducted for him, and definition of information/intelligence provision to the user defining how data analyzed by the AE is presented to the user which may include the presentation of different courses of actions with their associated analyzed comparative utilities.

Referring again to FIG. 1, Data Feed Connector/Translator 60 may be implemented in a variety of ways depending on the AE's environment. For example, the Data Feed Connector/Translator may include plug-ins, such as a table that translates the AE's information requirements to Remote Function Call, SQL query, or XML query requirements, or BAPIs.

Multi-level meta-logic layers 760, 810, 910 (see FIGS. 7a and 7b), may be used for evolutionary rule maintenance, modification, and learning may be used to check on rule successes, validate, evolve or reinforce rules based on success and relative rule fitness.

Main System layer 30 (see FIGS. 3a and 3b) may include one or more processes. Each main system layer process may be domain specific and/or use specific functions from a component in the library, or as defined by the wizard process 20. The Main System may include a filter mechanism (for functions such as simple KPI comparison, evolutionary KPI comparison, statistical process control, and Fuzzy Logic filtering and analysis); data aggregation and association (such as algorithms and hierarchical relational database); analyzer; modeler for actions (such as game theoretic analyzer, utility functions, and multiple course of action analysis with associated utility/fitness' functions given an objective); and actuator (for functions such as user-alert, decision support analysis presented numerically and/or plain language based on definitions, user defined automated action, automated action to other systems, automated action such as rule maintenance, reinforcement and/or modification, and triggering other processes). An actuator may also identify performance enhancing opportunities, contextual information, and interdependencies; quantify earnings enhancement potential and/or process improvements and the likely impact of decisions based on historic data and their interdependence; prioritize actions such as recommend and/or issue resource allocation, alert, or action item, execute a decision automatically; effect change in execution rules or parameters; and prioritize according to service and/or financial impact parameters.

Memory System layer (or subprocess 50, as shown in FIG. 1) may include a process usable for short-term memory data storage, e.g., where information is held only between iterations of AE process 10. Short-term memory may include maintaining/storing current system state data obtained through external data feed(s). This memory also maintains data, such as external feed and associated action rules applied, until the next iteration. Memory sub-process 50 may also include a capability to store so-called medium-term data, e.g., current applicable KPIs and rules subject to modification by the learning and modification layer. In an embodiment, associative memory may be used to store an audit trail of data association(s) between external data and system data such as rules applied to external data for action. This may be described as a requirement for learning, e.g., where a learning layer uses the associative memory to analyze the relative success rate of action rules. Memory sub-process 50 may include a capability to store so-called long-term data, e.g., an audit trail of data and/or rules applied to data, and a relative success rate of a rule application after analysis by the learning system layer 165.

Different types of data may be stored in the various segments of a memory used by an AE, and for various durations, for example:

Previous state (short-term);
History of previous states (long-term memory);
Initial KPIs (long-term memory);
Evolved KPIs (short- and long-term memory);
History of KPIs (long-term memory);
Initial Rule Sets (short- and long-term memory);
Modified Rule Sets (short-term and mid-term memory);
History of rule sets (long-term memory);
Statistical Process Control (SPC) parameters (short term memory-filter);
Fuzzy Logic parameters (short-to-long-term memory-filter); and
Data association and aggregation and connected rule application (short-term and mid-term memory).

One possible approach to creating a memory system may be through Neural Networks.

The AE system may include a journal to keep a record of system states and analyses, as well as the modifications effected—e.g., a track record of an AE system's history. The learning system may use the journal to look up data for longer-term data analysis, correlation, behavior and trend analysis. The AE may use the journal to notify the user of the reasons why it modified the system.

In addition to the embodiments of the logic and architectural components of the AE described herein, it should be noted that the AE could be implemented in different ways. For example, the AE may have a single database with different layers or a distributed architecture form, whereby the different modules described are stand-alone functional modules and interconnected by the logic as described. Moreover, all functional and logical modes are interdependent and may be linked through recursion over time.

General Attributes

An AE generated agent may be defined through the use of problem space specific rule, algorithm and optimization libraries and associated objective definitions facilitated by a preprogrammed standards (based on best practice OR, industry standard or competitive best practices methods, or performance indicators) and/or through a user programmable wizard.

The AE may also include a primary application rule set that is recursively improved by a multi-hierarchical evolutionary modification and reinforcement learning system that represents meta-logic layers.

The AE may be customized or adapted by utilizing one or more of the following functions, properties, or actions:
- recursive sensing and aggregation of data from distributed systems;
- association, contextualization and correlation of data and data interdependence and interrelationships (obvious and hidden);
- recursive analysis of input data with subsequent Key Performance Indicator evolution; and,
- if analyzed as beneficial, rule reinforcement or modification;
- recursive filtering of data using Statistical Process Control and Fuzzy Logic Filters;
- recursive fitness classification of data; Meta-reasoning layers;
- recursive gauging/evaluation of success-level of previous applied actions by the AE i.e., how did previous action at t=1 change the system state at t=2—if the previous action changed the system state to a state of greater evaluated utility then the action linked to an environmental condition is reinforced—if not the action will be modified;
- learning from experience—system effected reinforcement or modification;
- user-teaching—user forced reinforcement or modification;
- hidden relationship correlation and analysis—which conditions, objects and events impact a certain business objective—automated linking of business objects for further analysis and/or user alert;
- AE's capability to analyze its own performance and improve its own parameters;
- automated action capability with subsequent success analysis as to the outcome of the action effected;
- AE's learning capability based on reasoning of the AE's own actions' successes;
- AE's innate learning capability that may be trained by users—for example by assigning greater importance or synaptic weight definitions to parameters or by defining constraints.

Referring again to FIGS. 2a and 2b, wizard process 20 includes receiving (70) a business objective from a user, and/or determining (75) parameters so that an appropriate pre-programmed template may be used to define a data set and/or executable code to achieve the business objective. Wizard process 20 may also include an inquiry (not shown) into sub-objectives, e.g., inquiring from a user or determining additional information that may be used to determine (e.g., define) the business objective and/or supplement the objective.

In an exemplary situation, a user may input a specific business objective (it could also be a combination of business objectives that are processed in parallel, or the objective could be defined by an external system). In this case the user may want the AE to generate an agent(s) to achieve a business objective of "reducing capital bound in inventory". This is a common business objective (e.g., a problem), therefore "Reducing capital bound in inventory" may correspond to an available business objective template component in library 25 and may be used by definition wizard 20 when generating an agent.

In another example, a user may input an objective of "reducing capital bound in finished goods inventory and checking an inventory level on a product" (SKU level in connection with a single fulfillment warehouse site). In this case, the AE may generate an agent(s) that may use two types of inventory as data input: physical inventory days at a warehouse and logical inventory levels related to inventory ownership. In addition, the AE may generate an agent that may be used to detect slow moving inventory both in a business' warehouse as well as in a business' retail stores. If slow moving products are identified, the AE may include a promotional process to encourage sales of the slow moving products. Moreover, the AE may generate an agent that issues a "pull" order if it is determined the supply chain includes a fast moving item, in order to ensure that no stock-outs occur at retail stores and to ensure continuous revenue generation of products in demand.

The problem of minimizing capital bound in inventory has several sub-objectives and factors whose achievement determine the extent to which capital is bound in inventory. In this example, the sub-objectives related to the business objective may be characterized as follows:
- Credit Lines the company offers to the retailers—seldom coincides with physical stock transfer as payment is effected usually later;
- Credit lines suppliers offer to the company—seldom coincides with physical stock transfer to the company's warehouse;
- Stock turnover by product line item at the warehouse but also at the retail store level—physical as well as from an ownership point of view;
- Cost of capital;
- The speed with which order are fulfilled by the supplier as well as by the fulfillment warehouse to the retailer and the speed with which the retailer is bringing products to the shelves; and
- The degree of supply chain responsiveness (minima/maxima range for suppliers to deliver as promised). The AE may establish the actual pattern of this responsiveness and could effect automatic reordering based on pre-defined and subsequently evolutionary supplier delivery performance criteria and patterns.

In order to improve a generated agent using an agent engine process (in this case minimizing capital bound in inventory), the AE may need to determine parameters during performance of wizard process 20:
- Opportunities to minimize buffer stock without risking critical replenishment to stores;
- Opportunities to push surplus inventory to retail stores by, for example, effecting promotions through item specific incentives or promotional packs that contain either a combination of slow and fast moving items that are marginal discounted and/or comprise only slow moving items that are heavily discounted;
- Opportunities to push surplus inventory to retail store with different consumer behavior/demographics;
- Ways to improve supply chain synchronization such as more effective ordering patterns and supplier performance evaluations; and
- Ways to sense in real-time or on a regular basis (e.g., daily basis) actual consumption patterns such as connectivity to business partner's ERP systems, EPOS systems, smart shelves, etc.

Once the business objective (and any sub-objectives) is defined (70), objects relating to the objective may be identified (80) and mapped into a relationship (e.g., using logic and/or rules). The following objects are examples of the type of objects that would require mapping in the present example: supplier object, customer object, product object, sales order object, purchase order object, and invoice object.

Key performance indicators may be linked (90) to objectives. KPI's relate to information of business objects. KPIs may be defined by setting forth questions to the user. The users answers to those questions may relate to the business object for which data needs to be sourced. For example, in the present example, exemplary questions may be presented to the user:

What is the ACTUAL lead-time range from time of placing order to receiving a product in the warehouse?
What is the ACTUAL lead-time range from placing product on the retail shelf from the fulfillment warehouse?
When are purchased products paid for?
When are sold products paid for?
How fast are which products moving?
How slow is which product moving?
What is the cost of holding products in inventory?
What is the cost of capital?
What is the transportation cost element for each product?

The above questions may be translated into KPIs, which in turn may be related to a business object. Once the relationship to a business object is determined, data feeds 62 may be defined (61), for example, by using a remote function call 64, an SQL query 66, or an XML document 68.

Figure 4A:
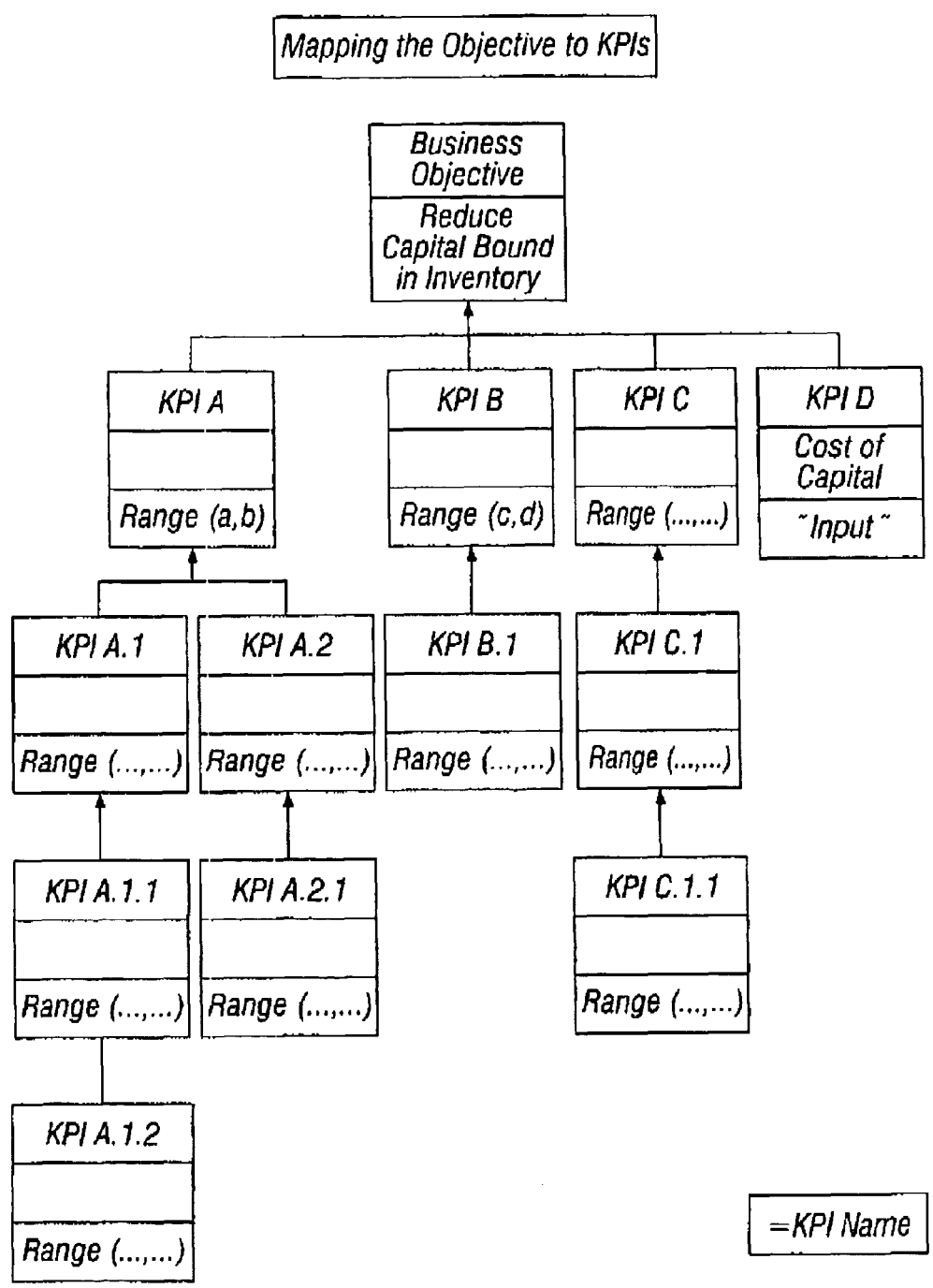
FIGS. 4a and 4b shows an embodiment of mappings among objectives and KPIs.
Figure 4B:
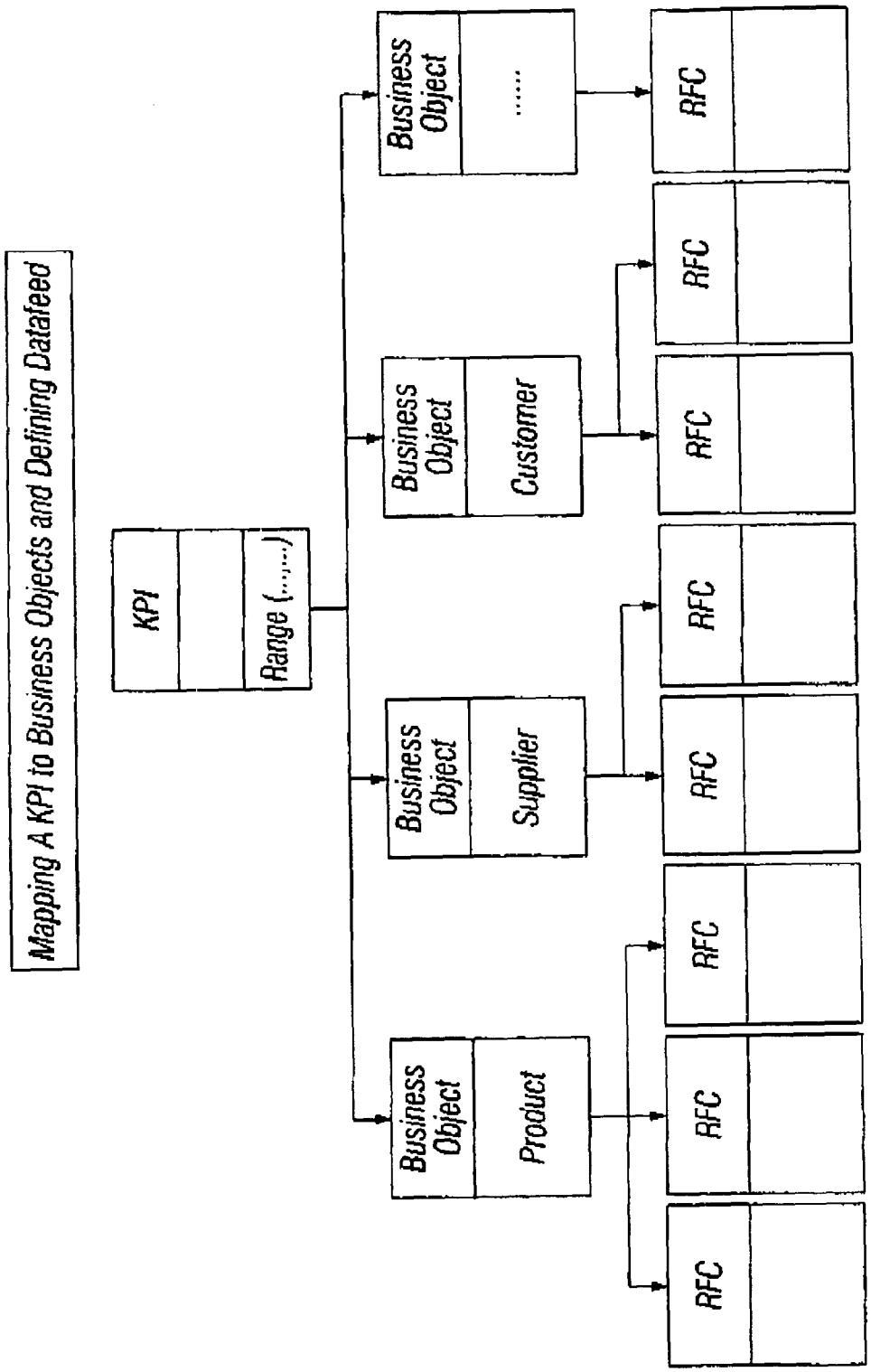

FIGS. 4A and 4B are example templates for an AE implemented to achieve a business objective corresponding to "reduce capital bound in inventory" using definitions and mappings of KPIs as well as business objects.

Once the KPIs are mapped by either the user or through the importation of a standard template (e.g., relating a standard KPI mapped to a specific business objective), the user may either confirm the standard KPI value definitions, if they have already been defined (e.g., standard value definitions could feature industry standard or competitive best-in-class KPI values), or modify existing and/or enter new KPI value. The user may also choose whether to change a KPI value definition, for example, if the user is aware of existing value constraints or elect the value (or value range) as an initial KPI value, thereby, allowing for modification during performance of the AE. If the user chooses an initial definition of a KPI value, the AE may subsequently modify the KPI range based on detected data inputs with the aim of improving upon those initial KPI values, so that a business objective linked to the KPI may be improved.

KPIs are typically related to a business object 340. For example, a KPI that seeks to establish how fast products are moving may require combinatory information such as:

Products; and
Customer Orders (or sensing of product uptake through EPOS or smart shelves).

In the example of a KPI that is defined to determine how fast a company may fulfill in-time replenishment of stock at stores without ever running out of stock at the store (which might cause a loss of revenue) the objects needed to provide additional information may be:

Supply lead-times from order placement to fulfillment warehouse, which in turn requires information about supplier responsiveness and transportation lead-times; and
Lead-time from fulfillment warehouse to retail stores.

These informational requirements may be mapped to specific business object information, and may be included in library 25.

Once the required business objects have been identified, the data sets required by each business object are identified 350. The data related to a business object may be obtained from an external application such as a CRM, an ERP, a BW, and/or a SCM application by defining remote functions that call the information from the external application and import the data into the AE. This would define the data input into the AE from external application according to a defined objective.

Methods of importing external data include Remote Function Calls, SQL queries; XML queries; BAPIs (Business Application Programming Interface), business objects, any other type of query functions and formats, and defining plugins.

The Main System Layer 135

In the main system layer 135, the AE may include code that may be used to perform multiple actions. For example, the main system layer may include sensing data based on defined objectives. The objectives may be user-defined objectives or they may be system objectives, for example, in cases where the AE is performing as an application layered between (or across) different applications and providing a service or a synchronizing and/or intelligence function to those applications. In addition, the AE could be linked to other applications through BAPIs.

In the main system layer 135, the AE may translate and map the data so that it relates to the AE, for instance preparing external data feeds through aggregation and association between different tempo-spatial data sets. However, additional data translation and mapping may be required depending on the AE definition, the AE's data structure format, and the data structure format of external databases of external applications.

The AE may also perform functions of data association and correlation (for example, as part of main system layer 135, see FIGS. 3a and 3b). The goal of these functions is to detect relationships or associations between specific values of categorical variables in large datasets. This is a common task in many "data mining" projects (and in a related subcategory referred to as "text mining".) Data mining and text mining refer to processes used by analysts and researchers to uncover hidden patterns in large data sets, such as "customers who order product A, often also order product B or C" or "employees who said positive things about initiative X, also frequently complain about issue Y but are happy with issue Z." The implementation of the so-called A-priori algorithm (see Agrawal and Swami, 1993; Agrawal and Srikant, 1994; Han and Lakshmanan, 2001; Witten and Frank, 2000) allows one to process rapidly huge data sets for such associations, based on pre-defined "threshold" values for detection. In a given data set or data sets, the purpose of the analysis is to find associations between the data points, i.e., to derive association rules that identify the data points and co-occurrences of different data points that appear with the greatest (co-)frequencies or other such patterns.

Fuzzy Logic algorithms may also be applied to achieve Correlation Analysis, for example, employing fuzzy logic in conjunction with frequency analysis of correlation. In an embodiment, fuzzy logic may be applied in conjunction with frequency analysis, and/or along with sensed condition analysis. In this case, the analysis may be applied to determine synpatic weight reinforcement (e.g, in a case of neural network employment) and/or other types of reinforcement algorithms.

Cross-tabulation tables, and in particular Multiple Response tables may also be used to analyze data. However, in cases, such as unique data analysis, when the number of different items (categories) in the data is very large (and not known ahead of time), and when the "factorial degree" of important association rules is not known ahead of time, then these tabulation facilities may be too cumbersome to use, or simply not applicable. The a priori algorithm implemented in Association Rules will not only automatically detect the relationships ("cross-tabulation tables") that are important (i.e., cross-tabulation tables that are not sparse, not containing mostly zero's), but also determine the factorial degree of the tables that contain the important association rules.

The AE may be used to analyze simple categorical variables, dichotomous variables, and/or multiple response variables. For example, the AE may use algorithms to determine association rules without requiring the user to specify the number of distinct categories present in the data, or any prior knowledge regarding the maximum factorial degree or complexity of the important associations. In a sense, the algorithm may be used to construct cross-tabulation tables without the need to specify the number of dimensions for the tables, or the number of categories for each dimension. Hence, this technique is particularly well suited for data and text mining of huge databases.

In addition, the AE may be used to generate agents usable to perform data association and correlation in a recursive and dynamic manner. The data aggregation, combination and correlation mechanism could take the form of algorithms that aggregate, combine and/or correlate interdependent data. Logic for data aggregation, combination/correlation could also be defined that uses indexable relational databases, in order to establish required data aggregation, combination and/or correlation.

One purpose of data aggregation, combination and correlation is to identify data interrelationships and/or interdependence that may be evaluated in their combination by the AE. This relationship between interdependent data is desirable in order to effectively analyze and improve an objective.

Data association and correlation may be driven by business objects that are linked to KPIs and ultimately to the business objective. For example, if the business objective and a resulting KPI indicates that a business object referred to as a "customer account" should be analyzed, the data association model may associate data related to a business object "customer account". In more detail, an existing mechanism for a "customer account" used by an on-line web-site (e.g., served by a computer network) may check category of books are of interest to a particular customer or other customers fitting a similar customer profile. The association and correlation mechanism may include the capability for the following:

Highlight data relationships that are connected to defined business objectives that may be exploited for user alerts or automated action (such as information provision to alert customers) or decision-making. This would be a largely a top down approach, i.e., driving data association from objective definitions;

Serve the validation, modification of data associations related to KPIs and business objectives;

Create a bottom-up approach whereby the AE identifies data association and correlation itself for information provision to the user. In this, case this is not pre-defined. It should, from this premise, be possible to create new AE objective definitions (for example, that relate to consumption patterns) and subsequently create new KPI maps that evolve over time as the data association and correlation changes (for instance based on changes in consumer consumption patterns or buying behavior);

Drive certain automated actions; and

Create alerts by comparing and highlighting differences between defined and AE analyzed data relationships and interdependencies.

Main system layer 135 may also include a generated agent that may perform contextualization. In more detail, the AE may contextualize data in order to form a business objective optimization function. As in the case for data aggregation and correlation, this fixed definition, by way of a template definition, for example, may also be achieved through a data association and/or contextualization algorithm that drives subsequently associated data mining actions or a relational database that indexes logical data association and/or contextualization. Algorithms are known that may negotiate meanings to enable semantic interoperability between local overlapping and heterogeneous ontologies. The algorithms may reconcile differences between heterogeneous ontologies, or search for mappings between concepts of different ontologies. The latter algorithm is composed of three main steps: (i) computing the linguistic meaning of the label occurring in the ontologies via natural language processing, (ii) contextualization of such a linguistic meaning by considering the context, i.e., the ontologies, where a label occurs; (iii) comparing contextualized linguistic meaning of two ontologies in in order to find a possible match between them.

Main system layer 135 may also include code usable to perform routing functions to provide AE outputs such as analytical results, user role-generic alerts, automated action or any type of actionable intelligence to actors (which may be users or other information systems). The routing function is highly dependent on the domain in which the AE will be embedded, that is to say, to which use the AE is applied and with which other information systems the AE is to be associated or integrated. The routing function may require some mapping, for example, as to which input the AE will receive from which system, what actions the AE is required to perform, which outputs are required, and in which form to other actors (people and systems). For example, this routing could be achieved through systems integration or using a business connector type infrastructure. Another example of routing would require the domain specific definition of user interfaces, which presents the AE, sensed, analyzed information to users for action and/or make the reasoning, as to the AE's decision-making, visible to the user.

Main system layer 135 may also include code usable to perform a filtering function. The filtering function may ensure that the AE acts only on data or datasets that fall outside either pre-defined, evolved or automatically analyzed range limits. This reduces the level of complexity of the data and may increase performance. However, if the data fall within any of these ranges, the higher level rule maintenance system will interpret data that fall within these KPI limits as a success (with a possibility of incorporating a rule as to the degree of success) based on its logic and rule to reinforce successful application of prior applied related rules when the observed result is that the KPIs fall within acceptable range limits. For example, in simple, pre-defined range comparison, the AE may check KPI range limits and interpret whether and/or to which degree previous AE or external application actions have been successful. The pre-defined range definition may also serve as an initial training method as, for example, a business may wish to know the initial status of KPI after a first real data sensing, or a batch thereof. After the initial results, the KPIs may then be evolved.

In comparison to evolved KPI ranges, the AE may include code usable to evolve KPI range limits based on recursive analysis of data sets that have been linked to a KPI(s). The AE may check the relative success of prior AE or externally effected actions (by external systems or other actors) by comparing and relating prior action performed on data sets and linking these to the pertinent KPI parameters for validation. As a result, and depending on whether the KPI range has been met or not, the AE may reinforce prior decision-making and/ or action, and/or reinforce or modify KPI range limits. Whether this reinforcement occurs may also be dependent on definitions in the AE's underlying rule system. Typically, however, if the data sensed after an action validates an existing KPI range both the KPI range as well as the decision-making is reinforced. If the KPI range limit is not met, the KPI limit may be modified, or if the user permits, the AE will mark and modify its decision-making model (such as modifying decision-making parameters) and/or create a user-alert, depending on the AE's domain application.

Figure 5:
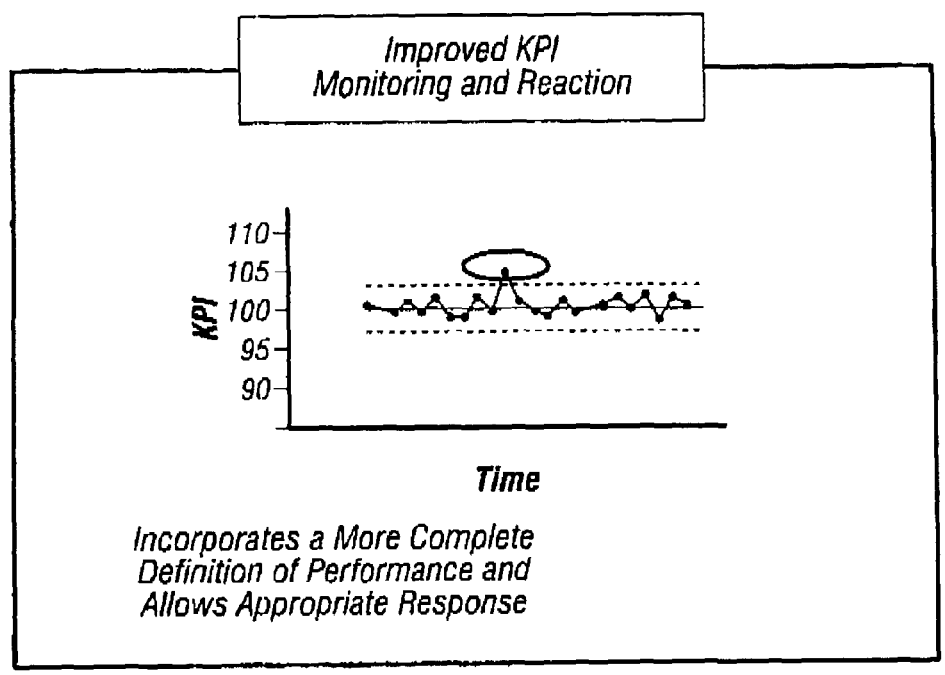
FIG. 5 shows a prior art chart of KPI versus time monitoring and reaction.
Figure 6A:
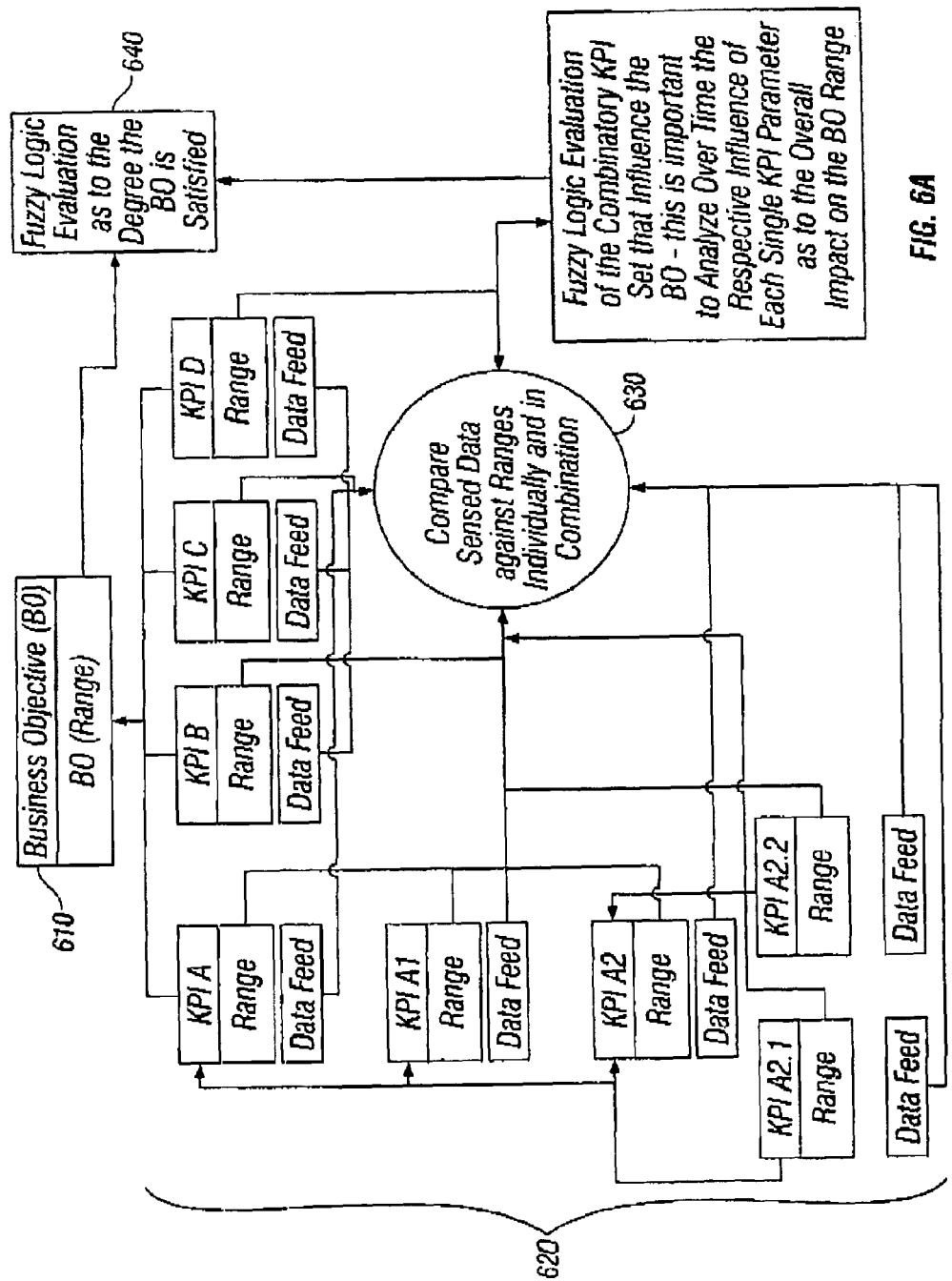
Figures 1, 6B:
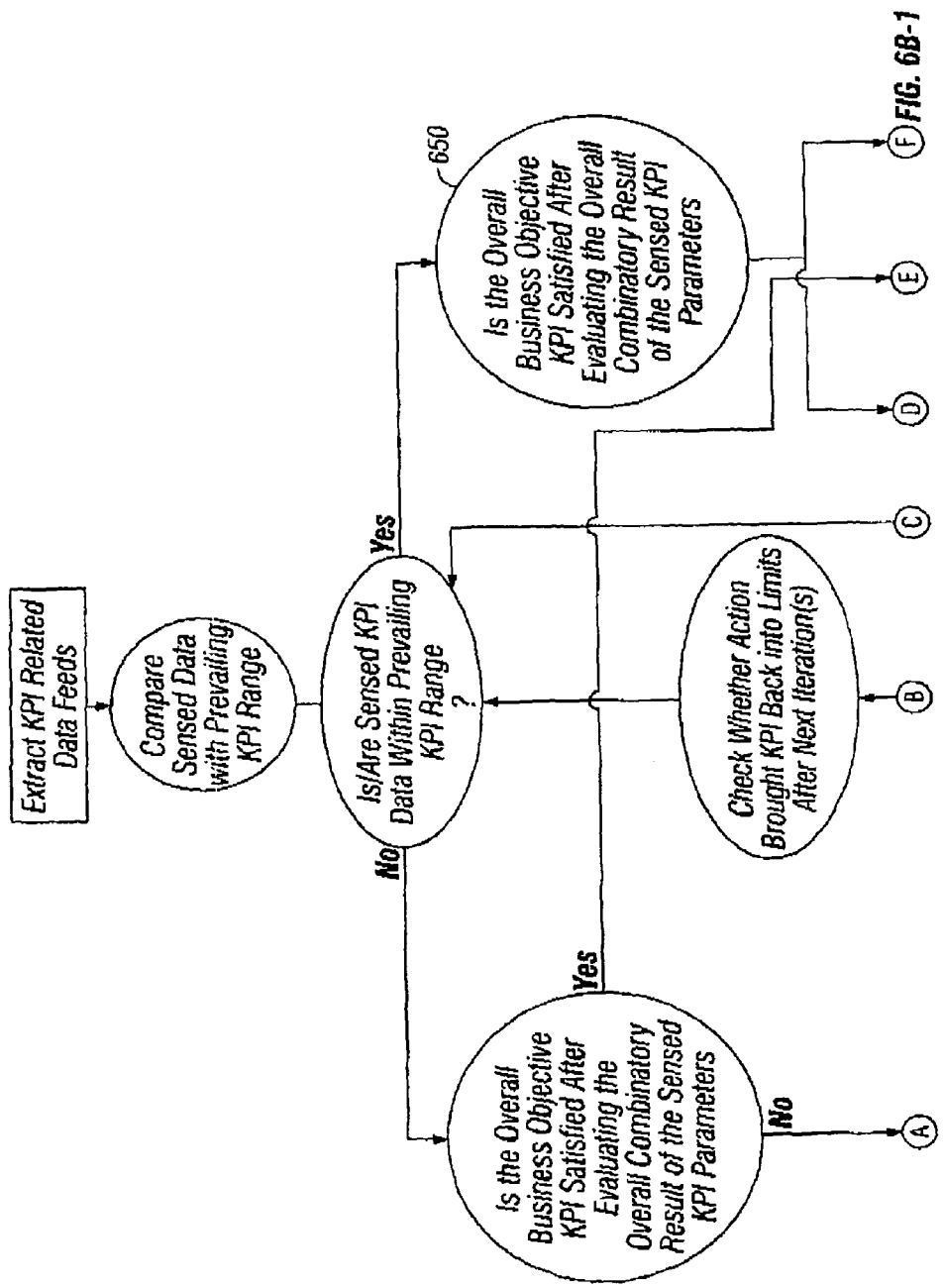

Primary Rule and Parameter Maintenance Layer 145 (see FIGS. 3*a* and 3*b*) may include a Statistical Process Control (SPC), e.g., a statistical evaluation mechanism using standard deviation that permits statistical process analysis (e.g., permitting the monitoring of KPI value evolution over time), the AE may monitor the variance of KPI evolution over time as shown by Jeffery T. Luftig, Ph.D., in FIG. 5 (prior art), which depicts a graph showing SPC filter applied to and an AE acting on a KPI value falling outside a defined KPI range. This would largely automate the exception monitoring process as to KPI behavior. In this case, the AE would only act upon detected KPI values that fall either below the minimum or above the maximum limit of the SPC chart. This would be helpful for the AE as those KPI values that are above the upper SPC limit could immediately create reinforcement of rules that were responsible for the above average performance, whereby KPI values that fall below the lower limit could immediately create a user-alert or a required rule modification action. Of course, one could define whether in either case action will be affected upon a single occurrence of such nature or whether a number of SPC limit violations would be necessary to either reinforce or modify the rules.

Main system layer 135 may also utilize Fuzzy Logic filters. As an example, a website whose address one the world wide web (WWW) is "programcpp.com" and describes Fuzzy Logic as a tool used to "represent imprecise, ambiguous, or vague information. It is used to perform operations on concepts that are outside the definitions of Boolean logic. It is a superset of conventional Boolean logic that has been extended to handle intermediate values between 'completely true' and 'completely false.' It was introduced by Dr. Lotfi Zadeh, a professor at the University of California in Berkeley in 1965, as a means to model the uncertainty of the real world."

One example of the usefulness of Fuzzy Logic is in the situation of hierarchal KPIs (see for example FIG. 4A). A higher level KPI may have other KPIs as subsets. In order to satisfy the business objective, the critical KPI is the KPI that is logically closest to the business objective. The higher-level KPI value may still be optimal or within range even if one or more lower level KPIs fall below its range, indicating a potential problem; however, the still other lower level KPIs may perform above nominal values making the higher-level KPI actually perform above average and within its limits. The KPIs need not be hierarchically dependent as described above, as it could also be combinatory dependent. The following example and tables 1-2 illustrates a possible scenario:

Hierarchical Application of Fuzzy Logic to Establish the Degree of Truth of an Argument or Value

| Business Objective Level KPI |
|---|
| Name: XYZ |
| Desired Range |
| (10, 50) |

| Business Objective Level KPI |
|---|
| Sensed Current Value |
| 30 |
| Average Sensed Value Variation |
| (5, 80) - Last 30 days |
| (15, 60) - Last 60 days |

| Lower Level Hierarchy to Business Objective KPI relation Table |
|---|

Resulting KPI for import into BO Level KPI 30
Relation rule KPI A * C + B = BO Level KPI
KPI A 30
KPI B 16.5
KPI C 0.45

First Hierarchy Objective Related KPIs

| KPI Name: A | KPI Name: B | KPI Name: C |
|---|---|---|
| Desired Range | Desired Range | Desired Range |
| | | |
| Sensed Current Value | Sensed Current Value | Sensed Current Value |
| | | |
| Average Sensed Value Variation | Average Sensed Value Variation | Average Sensed Value Variation |
| | | |

| KPI A1 + A2 to KPI A relation rule Table 2 |
|---|

Result for KPI A
Relation rule KPI A1 + A2 = A
Value A1
20
Value A2
25

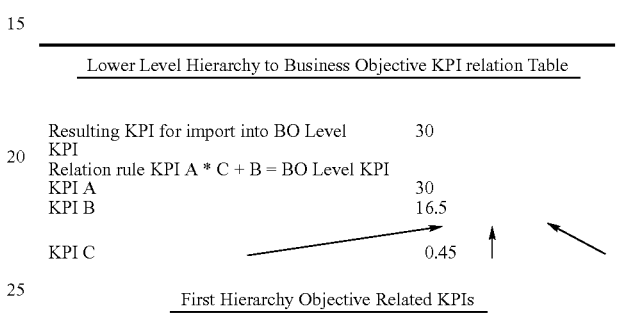

KPI Name: A1
Desired Range

Sensed Current Value

Average Sensed Value Variation

KPI Name: A2
Desired Range

Sensed Current Value

Average Sensed Value Variation

In some applications, the AE may need to establish to what degree a business objective or to what degree an argument or rule may be evaluated as true or false. This may be done through the application of a fuzzy logic algorithm by a) comparing different data sets, b) by defining absolute and relative truths operations, and c) by evolving the AEs ability to evaluate statements as the data sample evolves in quantity and quality over time.

Primary Rule and Parameter Maintenance Layer 145 (see FIGS. 3a and 3b) may include Fuzzy Logic 147 to determine a level or degree that associated data are related, e.g., determining a level or degree of their relative impact on each other and/or on higher level rules, KPIs, and/or ultimate business objectives.

Fuzzy Logic 147 may be further used to establish absolute or relative degrees of truths between data sets, whereby Fuzzy Logic may need to be trained as to what constitutes absolute truths. For example, if the AE were to evaluate a statement from a sample data set that is akin to the following:

Statement objective: "Evaluate as to whether a person is old"

The AE might have a data sample as follows, a boy of 1 year, a girl of 13 years, and a man of 18 years.

Given the sample of the above data set, the AE may determine evaluate that, based on this data set, the man of 18 is old. However, if two more data points were added to the above set, a woman of 45 and a man of 78, then the man of 78 is old. The definition of "old" becomes dependent on the data set. Use of an AE system may more objectively evaluate such an objective. For example, an AE system may include a definition of what constitutes old (as well as different degrees of old) may be required with which the AE may be "trained" using fuzzy logic definitions/algorithms. In this case, fuzzy logic definitions may be necessary for "intelligent" evaluations of data sets. In addition, a Fuzzy Control rule infrastructure could be recursively evolved so that the AE learns to evaluate data sets better as the available data set sample increases over time or develops patterns that may be evaluated with respect to statements as to their degree of truth.

Fuzzy Logic 147 (see FIGS. 3a and 3b) may also be used to evaluate a multi-variable data or multiple dataset. Some objectives to which the AE may be dedicated may require an evaluation of a combinatory data set with fuzzy logic. The associated or aggregated result of the evaluation may determine a single threshold value that may be used for either further analysis or action. For instance, if AE were to evaluate the following data set having 7 data inputs that are required to evaluate a statement for action (such as triggering a rule or to drive a user alert or an instruction, or a reinforcement algorithm), the following tables 3-6 show the difference between Fuzzy Logic and Boolean Logic application:

TABLE 3

|        | Sensed Input |
|--------|--------------|
| Data A | 45           |
| Data B | 20           |
| Data C | 0.7          |
| Data D | 30           |
| Data E | 7500         |
| Data F | 80           |
| Data G | 90           |

TABLE 4

Single Argument Evaluation Table

|        |                          |
|--------|--------------------------|
| Data A | Compare to Range 0-100   |
| Data B | Compare to Range 0-50    |
| Data C | Compare to Range 0-1     |
| Data D | Compare to Range 0, 100  |
| Data E | Compare 0, 10000         |

TABLE 4-continued

Single Argument Evaluation Table

|        |                 |
|--------|-----------------|
| Data F | Compare 0, 100  |
| Data G | Compare 0, 100  |

Data set sample association rule X=A+B+C+D−E+F+G

Data set sample evaluation rule IF X>2.5 then . . .

TABLE 5

Boolean Logic Evaluation Example 1 = True, 0 = False

|                          |      |      |
|--------------------------|------|------|
| Data A                   | 0.45 | 0    |
| Data B                   | 0.40 | 0    |
| Data C                   | 0.70 | 1    |
| Data D                   | 0.30 | 0    |
| Data E                   | 0.75 | 1    |
| Data F                   | 0.80 | 1    |
| Data G                   | 0.90 | 1    |
| Aggregated Result Data X |      | 2.00 |

TABLE 6

Degree of Truth (Range from 0 to 1)
Fuzzy Logic Evaluation Example

|                          |      |
|--------------------------|------|
| Data A                   | 0.45 |
| Data B                   | 0.40 |
| Data C                   | 0.70 |
| Data D                   | 0.30 |
| Data E                   | 0.75 |
| Data F                   | 0.80 |
| Data G                   | 0.90 |
| Aggregated Result Data X | 2.80 |

The above tables show the different evaluations based on Boolean and Fuzzy Logic.

Fuzzy Logic may be used to evaluate the degree of the truth of an argument, whereas Boolean Logic would require several evaluations to achieve the same result. Fuzzy Logic may associate data inputs from various sources and establish the degree of truth based on their association.

Moreover, Fuzzy Logic may be used for analysis and action determination. Fuzzy logic may be used to define self-maintained threshold parameters based upon the degree to which a statement is held as true. It may be used to effect automated action as to analysis or decision-making, depending on whether a Fuzzy Logic parameter is above, at, or below a certain threshold value.

Main System Layer 135 may include sensed data (see Sensor 133 on FIGS. 3a and 3b) inputs and compare them to KPLs and/or objectives in the following manner:

Direct comparison of data inputs against KPIs (single or in combination);

Comparison of data inputs after prior analysis and mapping following the AE's KPI map definition; and Following pre-analysis through Fuzzy Logic using Fuzzy Logic clustering techniques and/or Fuzzy Logic analysis for combinatory effects.

Main system layer 135 may also be used to analyze data. For example, once data has been filtered and identified as requiring some sort of action, analysis may either be done through the AE's analysis system and or an external expert analytical system (depending on the domain and the desired scope of analysis). Typically, the analysis performed by the AE at this primary application layer level deals with data inputs that do not conform/perform within the range limits of the pre-defined and/or evolved KPIs.

The analysis to be performed may be highly application domain dependent; therefore, the AE may include a library with standard analytical techniques, rules and algorithms that may be imported and utilized by the operating system. It is also possible to import templates for analysis that are linked and related to the pre-defined objective and KPI templates. These analytical templates, like the objective and KPI templates, may be modified as to their rule or parameter definitions.

The following analytical templates and rule library domains are examples of templates that might be available:
 Statistical Analysis;
 Fuzzy Logic Analysis;
 Adaptive Neural Fuzzy Control Analysis;
 Associative Data Analysis;
 Correlation Data Analysis;
 Evolutionary Analysis—Comparison Analysis of data at last iteration to previous iterations and analysis as to the effect (success/utility level) of prior applied action or rule modification by the AE;
 Analysis according to pre-defined rules (through templates or customized rules);
 Analytical Algorithms;
 Adaptive Logic Networks;
 Importation of Neural Networks for Novelty detection using neural networks as adaptive classifiers;
 Cause and effect analysis; and
 A definition system that defines what type of problem/objective and which data inputs will undergo what analytical process for which purpose. This may require a link between the analysis that is done with subsequent decision-making choices.

Depending on the objective, as defined by the analytical definition system, an additional analysis action may be included in the AE in order to improve (e.g., evolve) data and/or rules. The improvement may utilize a variety of improvement algorithms. Improvements may include the invocation of rules used to define the improvement and may translate into an action.

Main system layer 135 may include code that is usable to determine a best action to perform based upon a set of circumstances. Methods for deciding best action include:
 Modeling and simulation for best action;
 Utility analysis;
 Game theoretic analysis;
 Learning from previous experience, e.g., analysis based on learning the effects of previous analyses;
 The use of algorithms;
 Display of analysis to the user for user action and/or confirmation;
 Display of analysis to the user with suggestions for action and for user confirmation; and
 Automated decision on best action.

Main system level may also effect a determined action. The types of actions that may be effected by the AE system may include:
 User Alerts;
 Rule modifications;
 Automated actions;
 Instructions to other systems;
 Re-iteration of the process, if applicable.

Third and Fourth Layer

As shown in FIGS. 3a and 3b, layers 145 and 155 of the AE may be considered modification layers. In some embodiments, the modification layers 145 and 155 may comprise a single layer or more than two layers.

The modification layers 145 and 155 may be implemented as an intermediate process between the so-called learning system layer and the memory/library layers. The modifications layer may be used to manage the modification of evolutionary KPIs and rules and the application of algorithms in the memory system once the learning system identifies a need for modification. The modifications layer may also be used to reinforce successful rules and maintain the SPC and the Fuzzy Logic filters. It may maintain and manage a rule set for rule evolution and application and/or a rule set for KPI evolution, once they are triggered by the learning system. The modifications layer may be considered highly interactive with the learning system, e.g., the learning system layer may be "advised" about any changes in the rules, KPIs and/or parameters.

Rule Modification Layer 155 may include code (e.g., a generated agent) usable to apply a rule set and/or KPI to data from Main System Layer 135. Rule Modification Layer 155 may also perform maintenance of SPC and Fuzzy Logic parameters. Rule Modification Layer 155 may also include a check as to whether the sensed associated and aggregated data inputs result in objective values that are within predefined or evolved limit ranges and then decide which action to take. Rule Modification Layer 155 may also reinforce rule sets of generated agents (e.g., application) that produced successful results (e.g., outputs). Rule Modification Layer 155 may also check with the secondary modification system layer as to which rules to apply if the previous rule application was unsuccessful. Rule Modification Layer 155 may also perform an action-effect analysis (i.e., what was the effect of a previous action?), on any modifications that have been made.

As depicted in FIGS. 6a, 6b-1, and 6b-2 the AE may calculate 630 the degree to which data inputs falls inside or outside the KPI values. For example, a scenario might be that all KPI values 620 are met and the objective 610 is satisfied (which should logically follow if the KPIs are properly mapped to the objective). The AE may make observations 650 on the quality of the relationship between a PKI 620 and the objective 610 as well as between KPIs 620 for further reference. The layer using fuzzy logic may determine to what degree the objective has been met 640. If the objective has been met to a relatively high degree, the rules and the KPI range(s) that gave rise to this result may be reinforced with the option to narrow the KPI range either contemporaneously or after additional iterations that produce similar results. If the objective has been met to a medium-to-high degree of success, the AE may wait for subsequent iterations, in order to reinforce associated rules and the KPI limit range, before any modifications are made. If the objective has been met to a lower degree, the AE may observe this behavior over time and, at some stage, it may tweak a rule and/or a KPI range. In certain situations, it may make a KPI more stringent. For example, if the KPI concerns supplier performance as to the lead-time of delivery of stock to a warehouse from the date an order is placed, the AE may make this KPI more stringent and, as an automated action, advise the supplier automatically (by e-mail and/or electronic letter) that the lead-time requirement has been narrowed. This could also be achieved through an alert to the enterprise user, who would then manually effect this action and confirm this action to the AE.

In one embodiment, some KPIs may be met while other(s) are not, but the objective of the AE system is satisfied. For example, a layer using Fuzzy Logic may determine to what degree the objective has been met. The AE may investigate into the rules and data that are associated with the under-performing KPIs and determine whether the rules or KPI limits need to be revised and/or what action should be effected. During this process, the AE may look up in its various memories whether any rules exist pertaining to this situation and what to do in cases where a particular KPI is under-performing. A response to the latter question could take the form of a user-alert, a request to the user to define a new rule for this purpose, or further instructions to itself and/or peripheral systems.

In another example, the results output by a KPI may be determined as successful, while another is not, therefore, the objective is considered not satisfied. In this case, the AE may determine a degree by which the objective has not been satisfied. This degree may serve as a classification mechanism of what type of action the AE should take. If, for example, the objective has only marginally not been satisfied, then the AE may wait until after one or more iterations before taking any action. Alternatively, the objective may be classified as mission-critical, in which case the AE will act even on this marginal failure to meet the objective.

If some KPIs are met, but the objective is not satisfied due to the fact that the other KPIs that are linked to the objective are under-performing to a degree that the combinatory result of the KPIs linked to the objective give rise to the objective not being met, the AE may utilize the following actions (hard coded or soft coded or user-defined) options:

Request a new rule definition; and/or

Effect an automated action such as create a user-alert, check into the conditions and causes that are responsible for the under-performing KPIs that gave rise to the objective not being met and advise the user accordingly, and, if rules exist, effect automated actions. Automated actions include request to supplier, sales force, alert to management for action, effect automated revision of rules that may improve the situation either based on pre-defined if-then rules or based on AE "learned rules" by checking the memory for what proved to be effective action in the past under similar circumstances, and/or effect an action in external systems such as modifying reorder timelines, supplier classification, modifying order placements, changing mode of transportation from truck to air express, or the like.

Figure 7A:
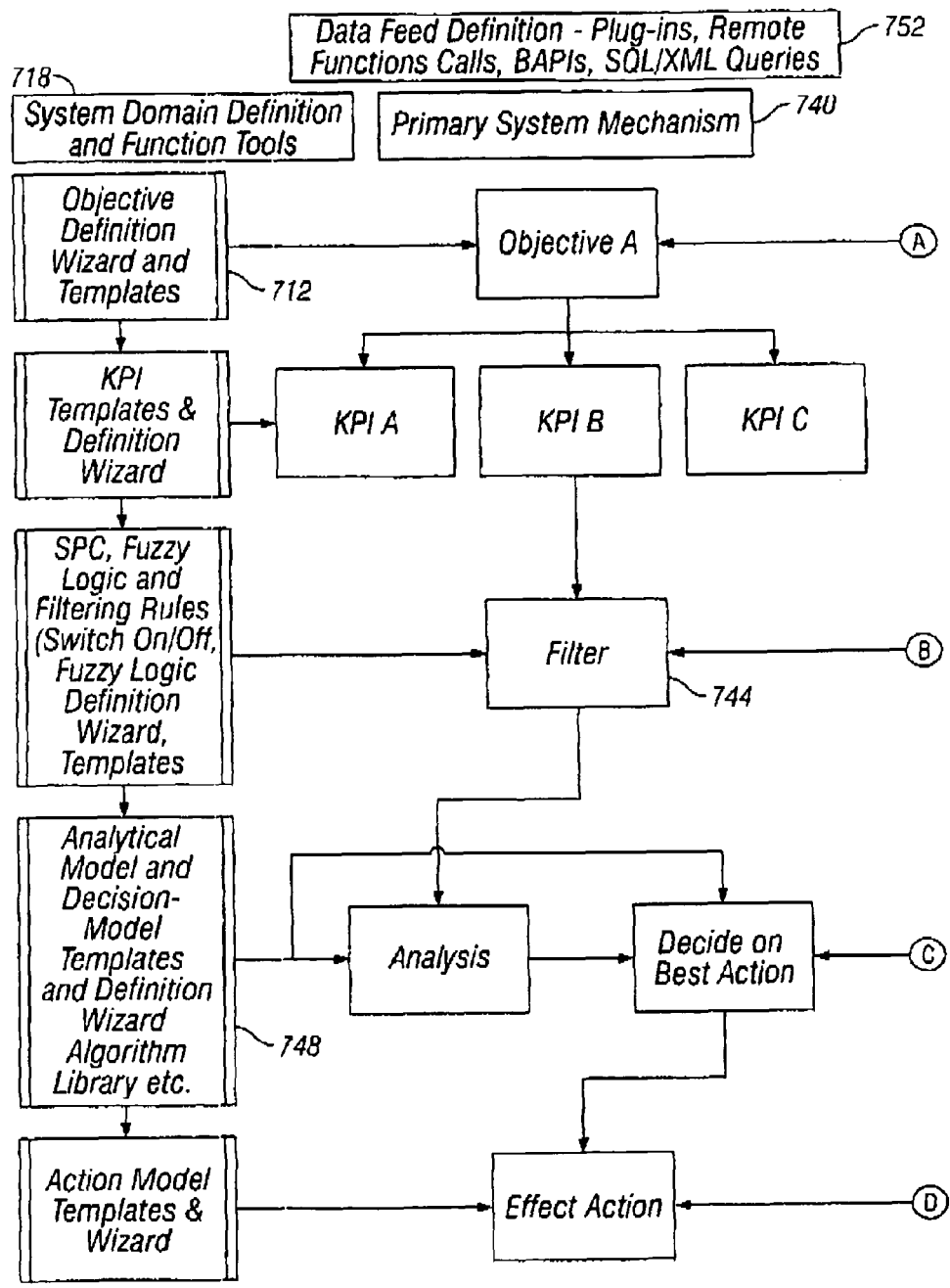
FIGS. 7a and 7b shows components of an embodiment of an Agent Engine.
Figure 7B:
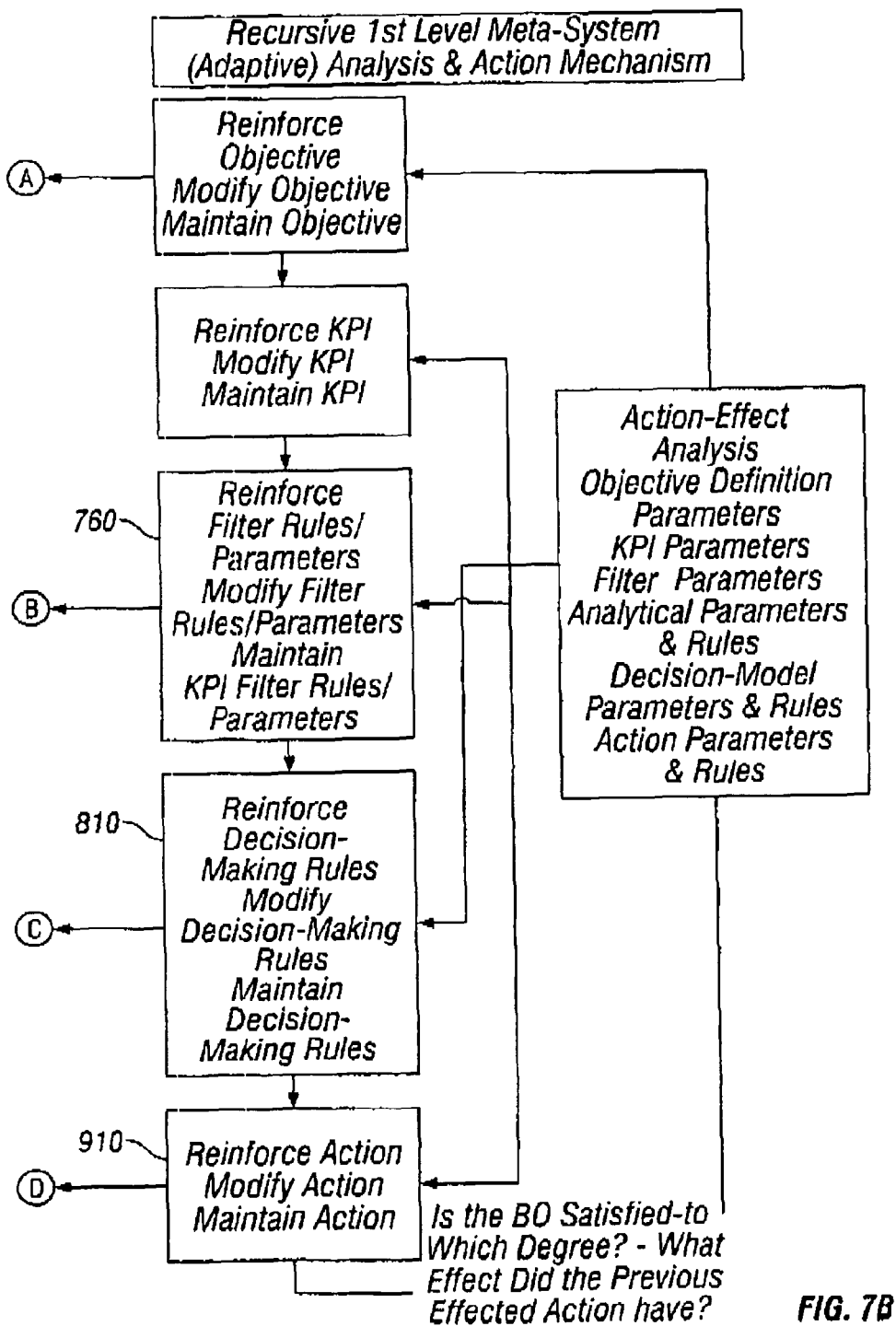

FIGS. 7a and 7b depicts a schematic diagram of the components of processes that may be included in the multi-layered AE architecture. The function tools 710 (712, 714, 716, 718, 720) are used by the AE to define the objective 730 and any sub-objectives. At the main operating system level 740, the AE may link and map objects, rules, and KPIs 742 to the objective, obtain and translate data, process the data and extract information through filtering 744, analysis 746, and decide on the best action 748 and finally effect an action 750. Throughout this process, the AE utilizes the function tools 710 it has available to it. As well as processing the data, the AE, at the primary meta-logic level, in a recursive manner, evaluates the objective, KPIs and their parameters, analytical rules and their parameters, filter rules and their parameters, decision making rules and their parameters, and any action to be taken. The AE considers whether to reinforce, maintain or modify any or all of these steps in the process of fulfilling the objective. The decision whether to reinforce, maintain or modify is influenced by the degree to which the objective is satisfied. For example, a rule might be modified to produce a result closer to the objective.

Functions of the Rule and Parameter Layer 155 (see FIGS. 3a and 3b) may be distributed over more than a single layer, and may be used to manage multiple KPIs and different types of rule sets in an evolutionary and selective manner. Together with the learning system, and based on the information gathered at the primary modification layer, it may determine which rules and KPIs to modify and when, as well as execute the modification. Rule and Parameter Layer 155 may include code to analyze the success of applied rule sets against KPIs and external data feeds.

Figure 8B:
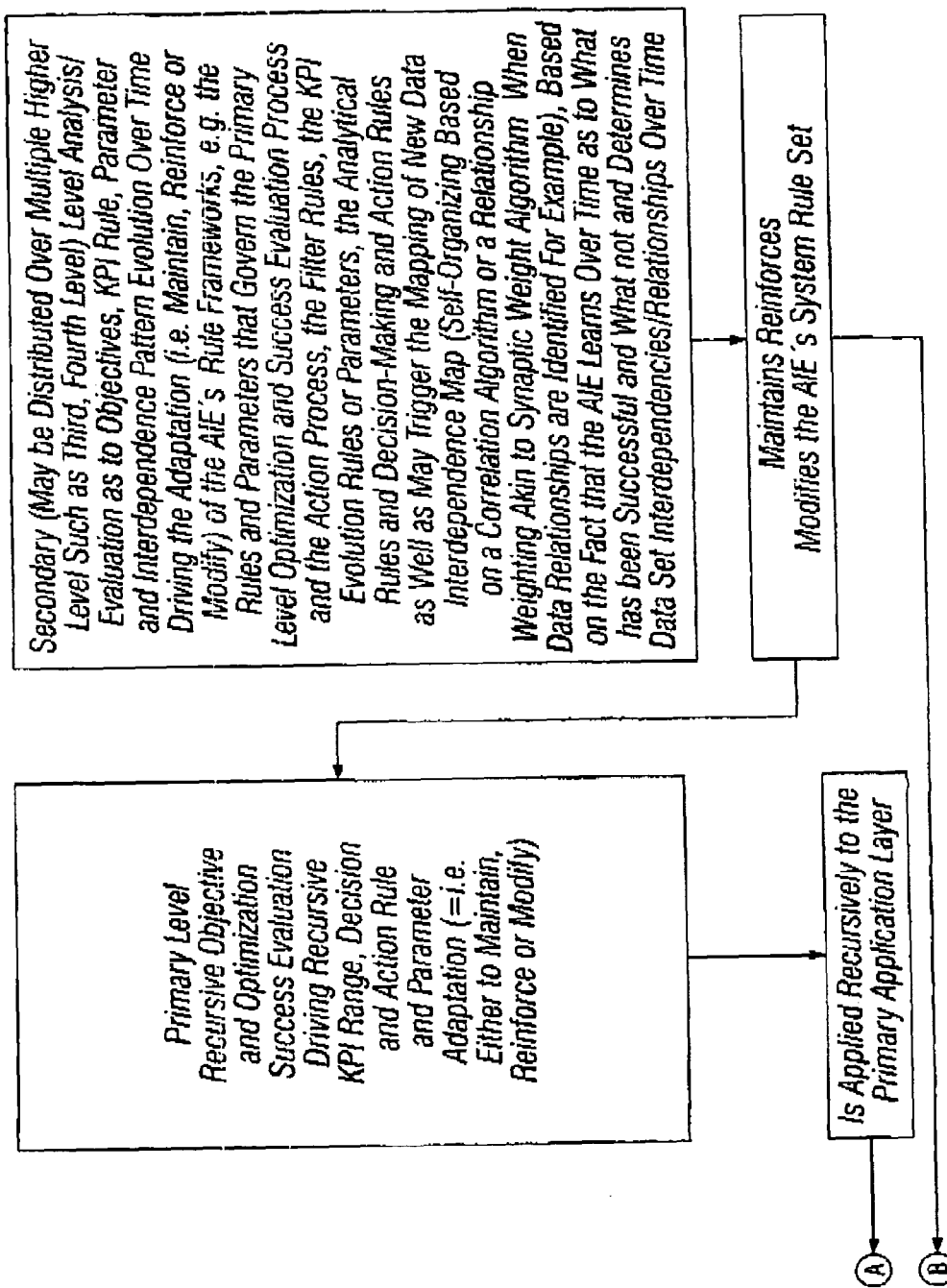
Figure 9A:
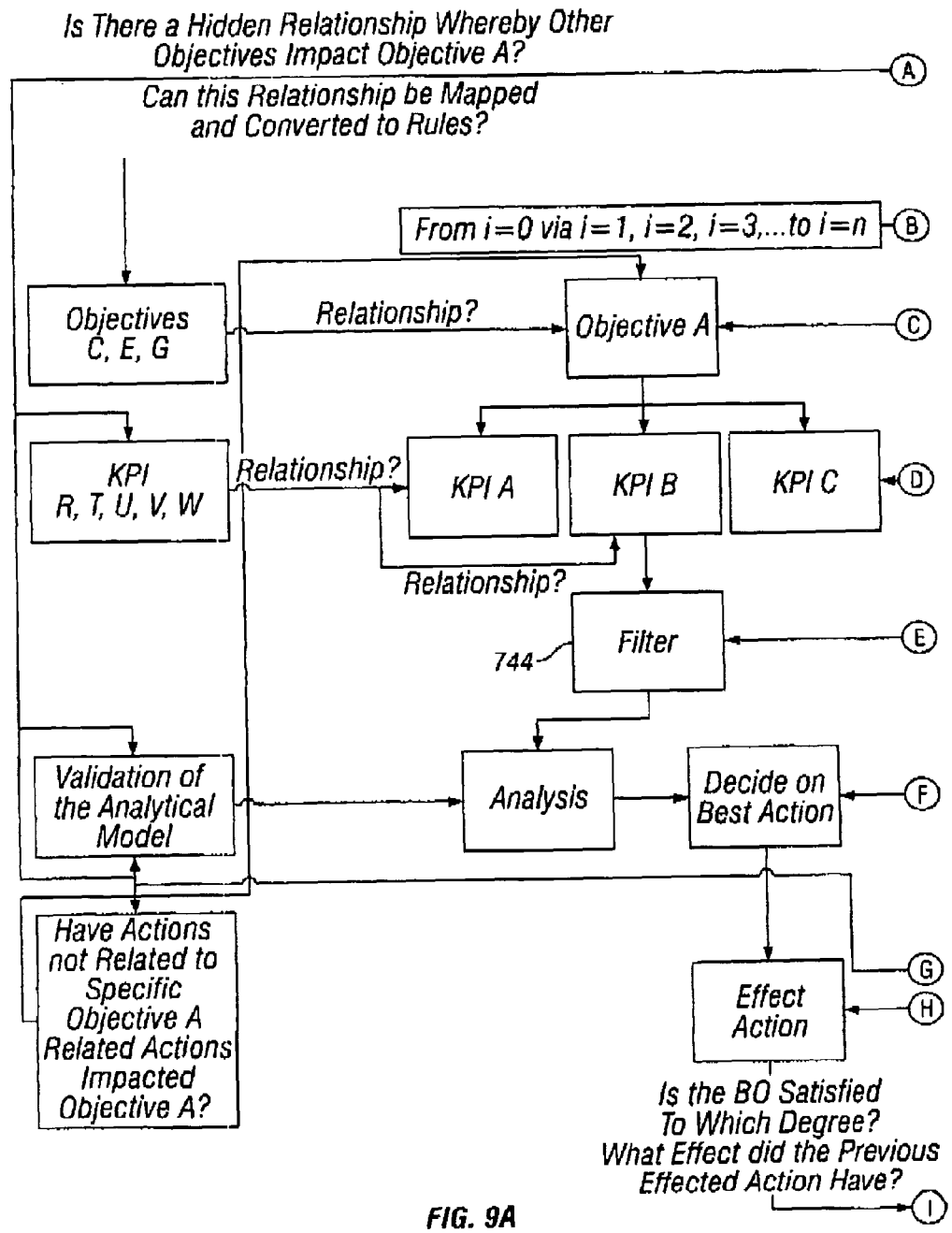
Figure 9B:
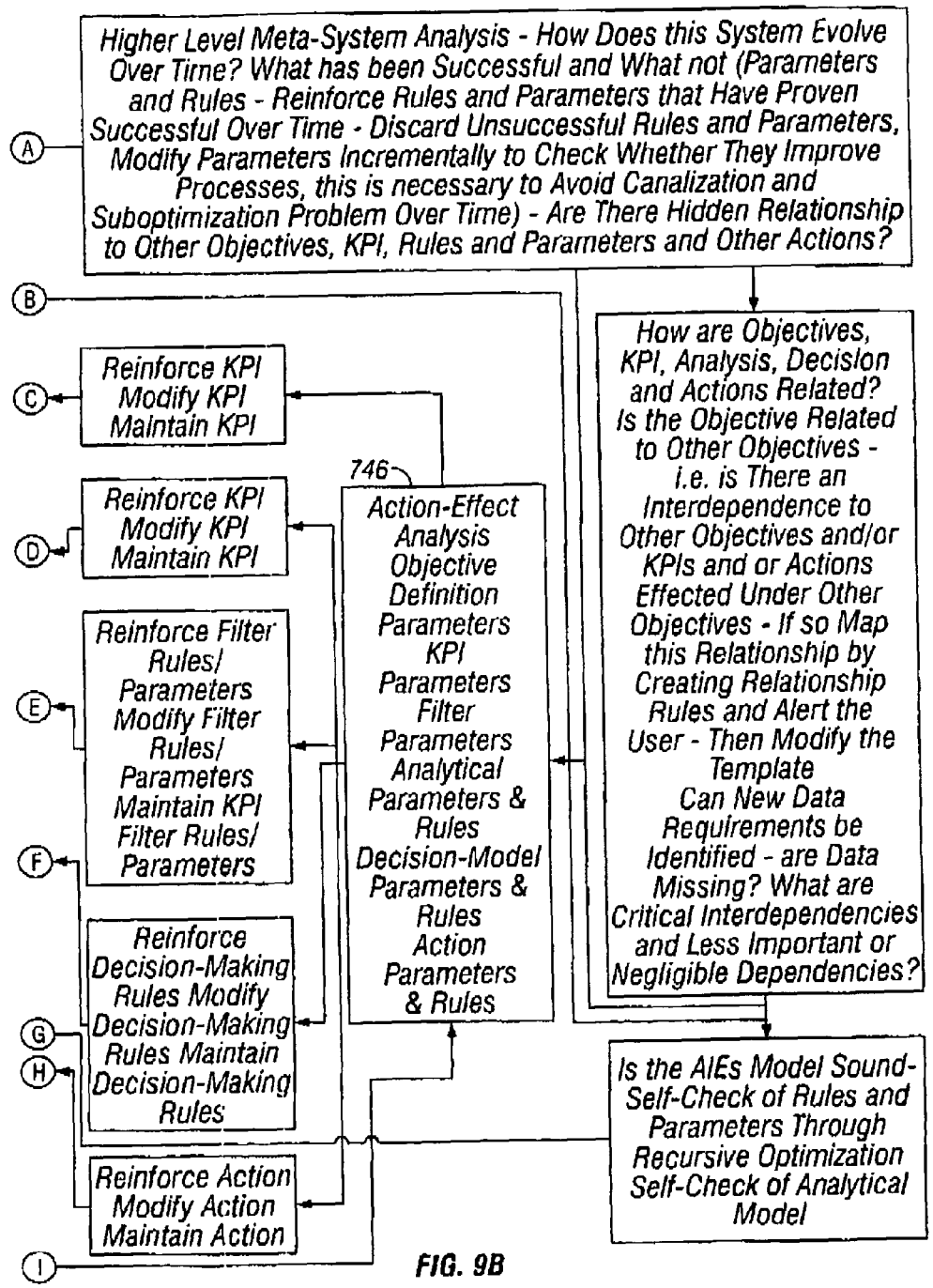
Figure 10A:
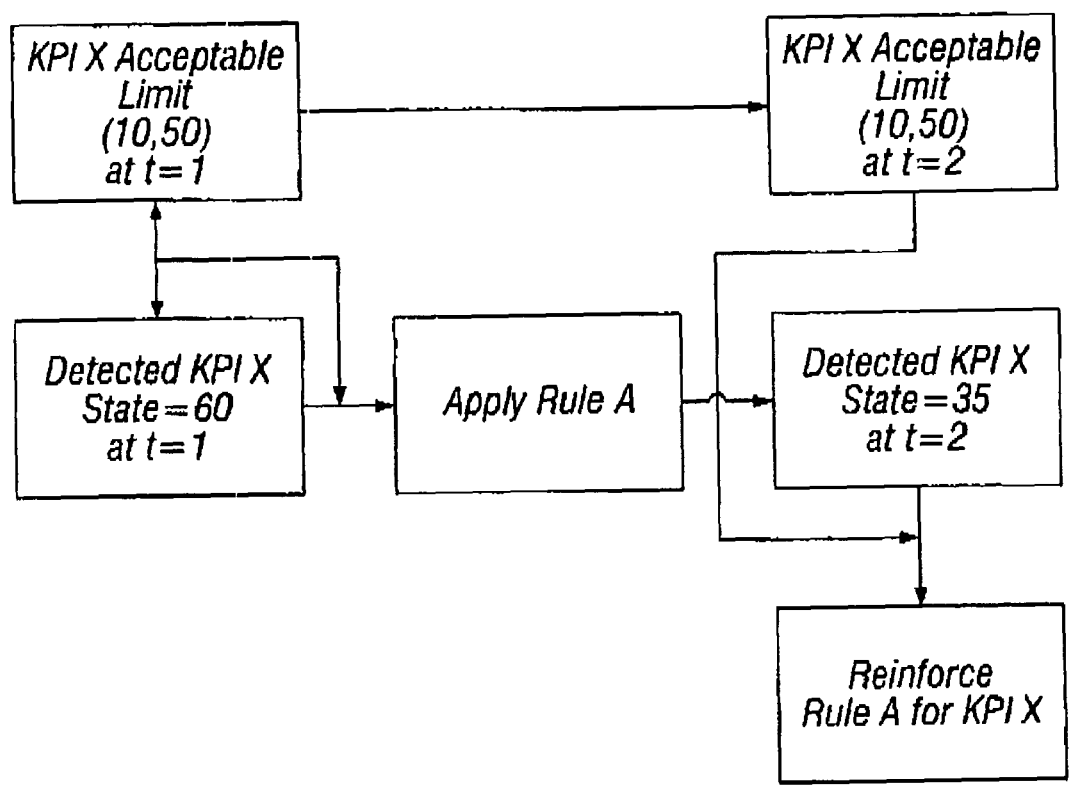
Figures 2, 10B:
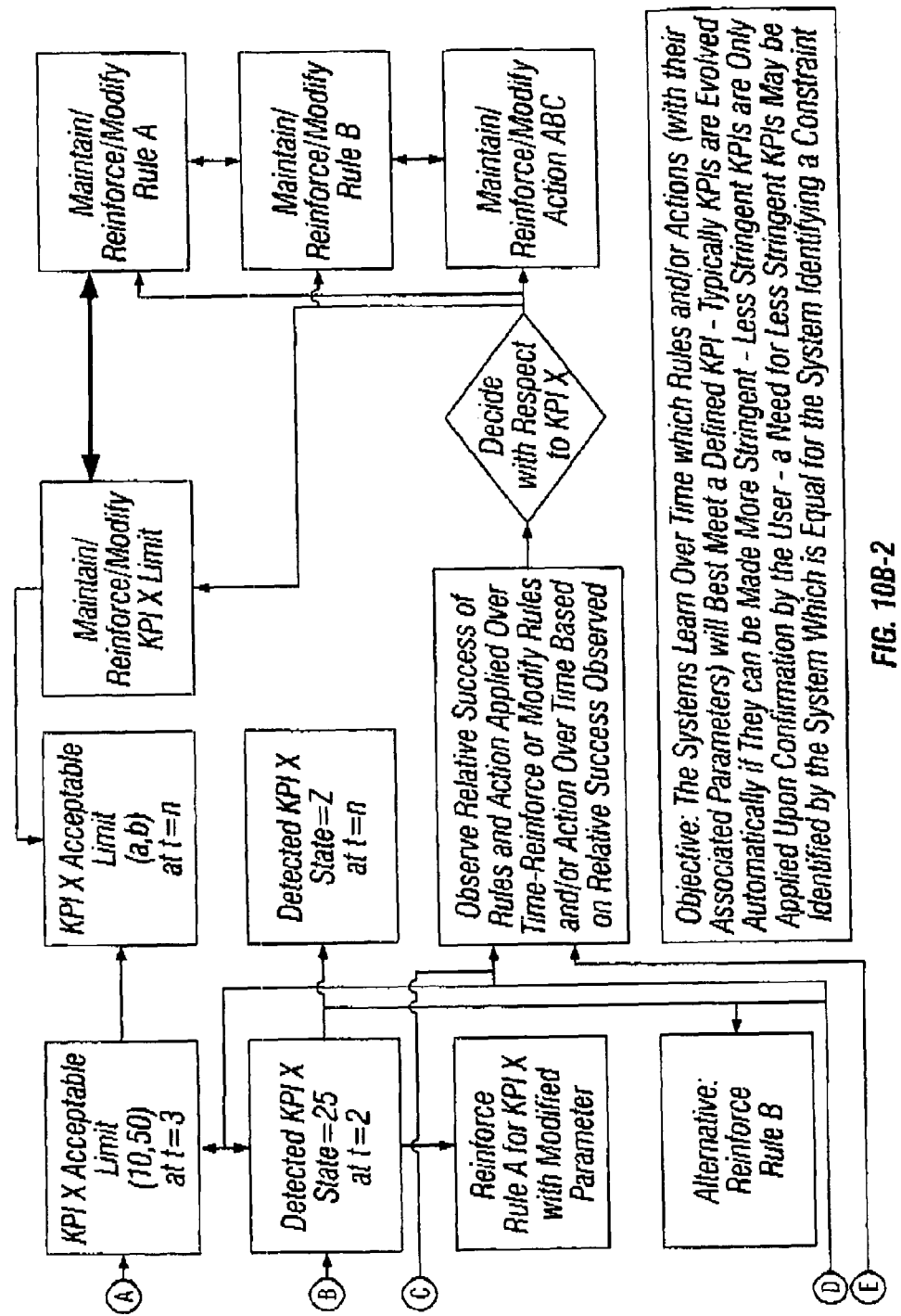
Figure 11A:
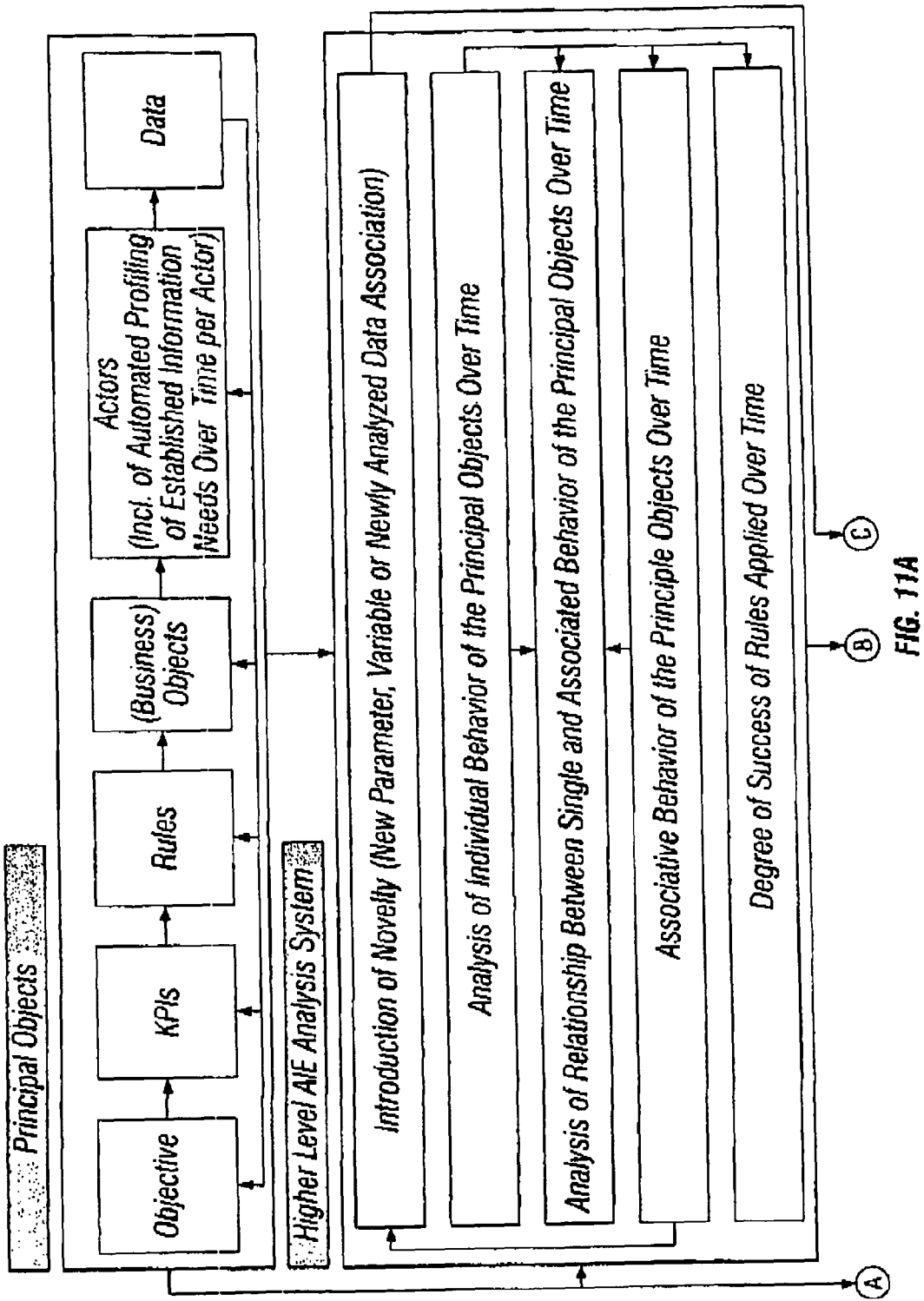
FIGS. 11a, 11b, 12a and 12b depict exemplary embodiments of an Agent Engine.
Figure 11B:
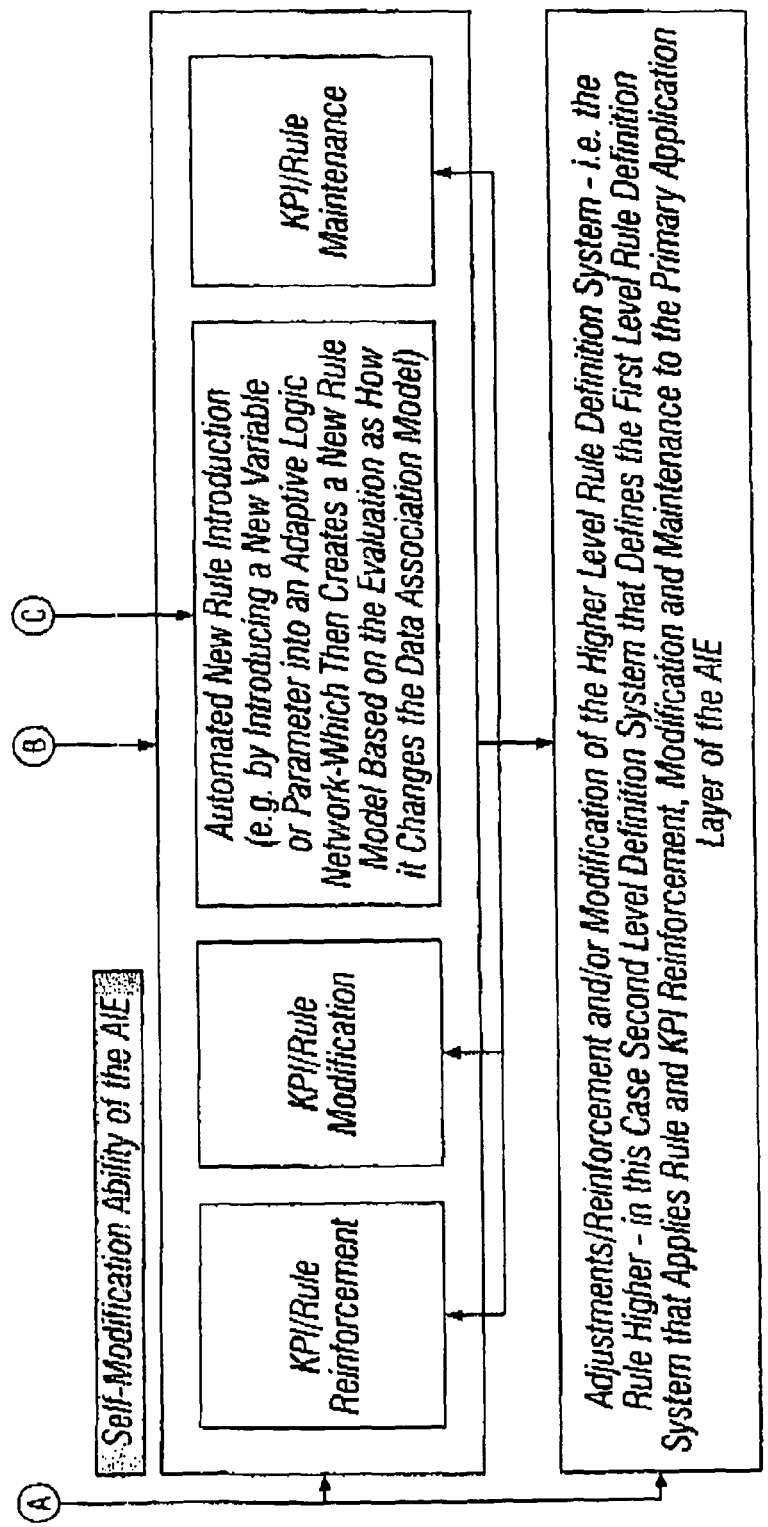
Figure 12A:
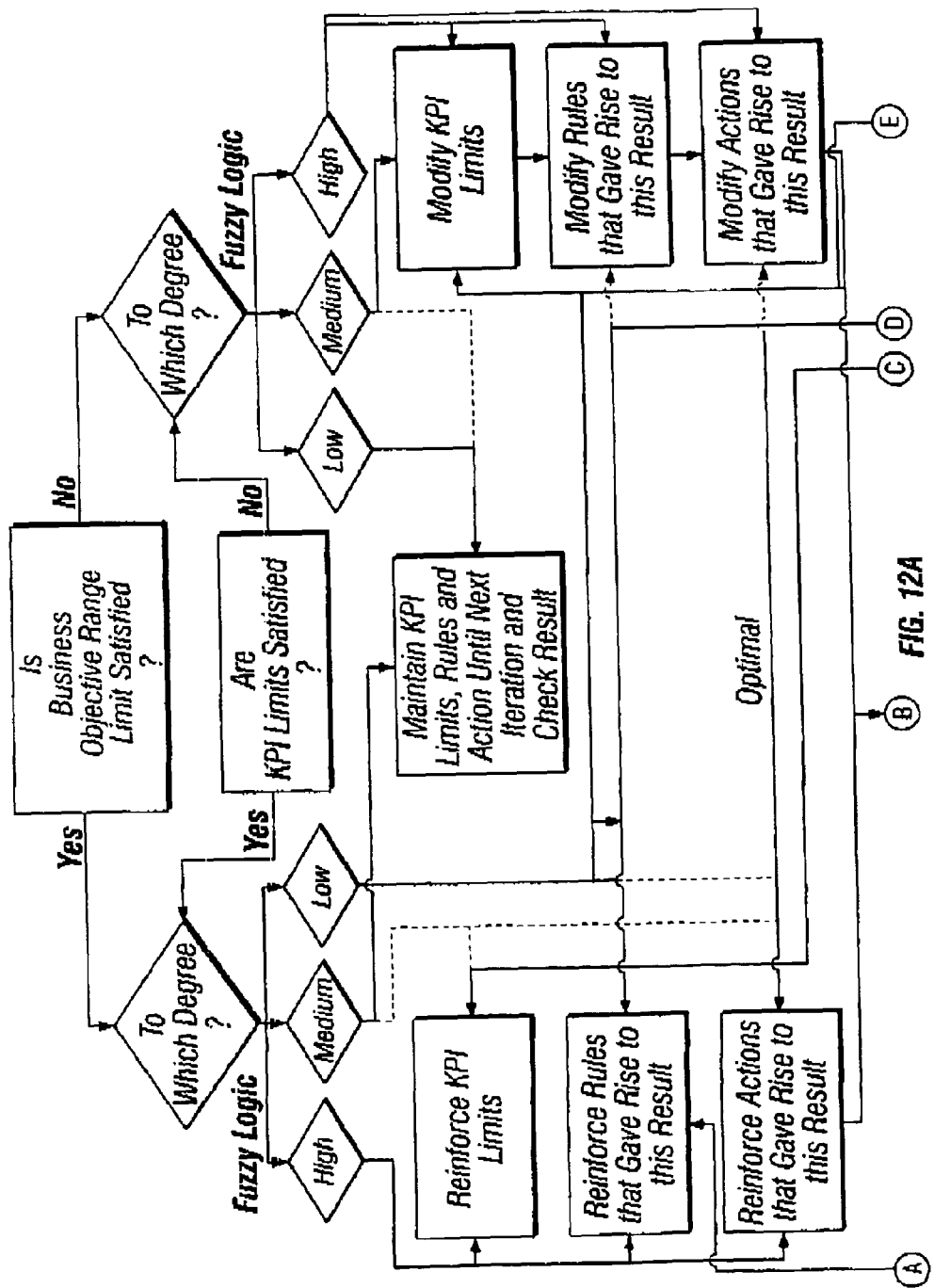
Figure 12B:
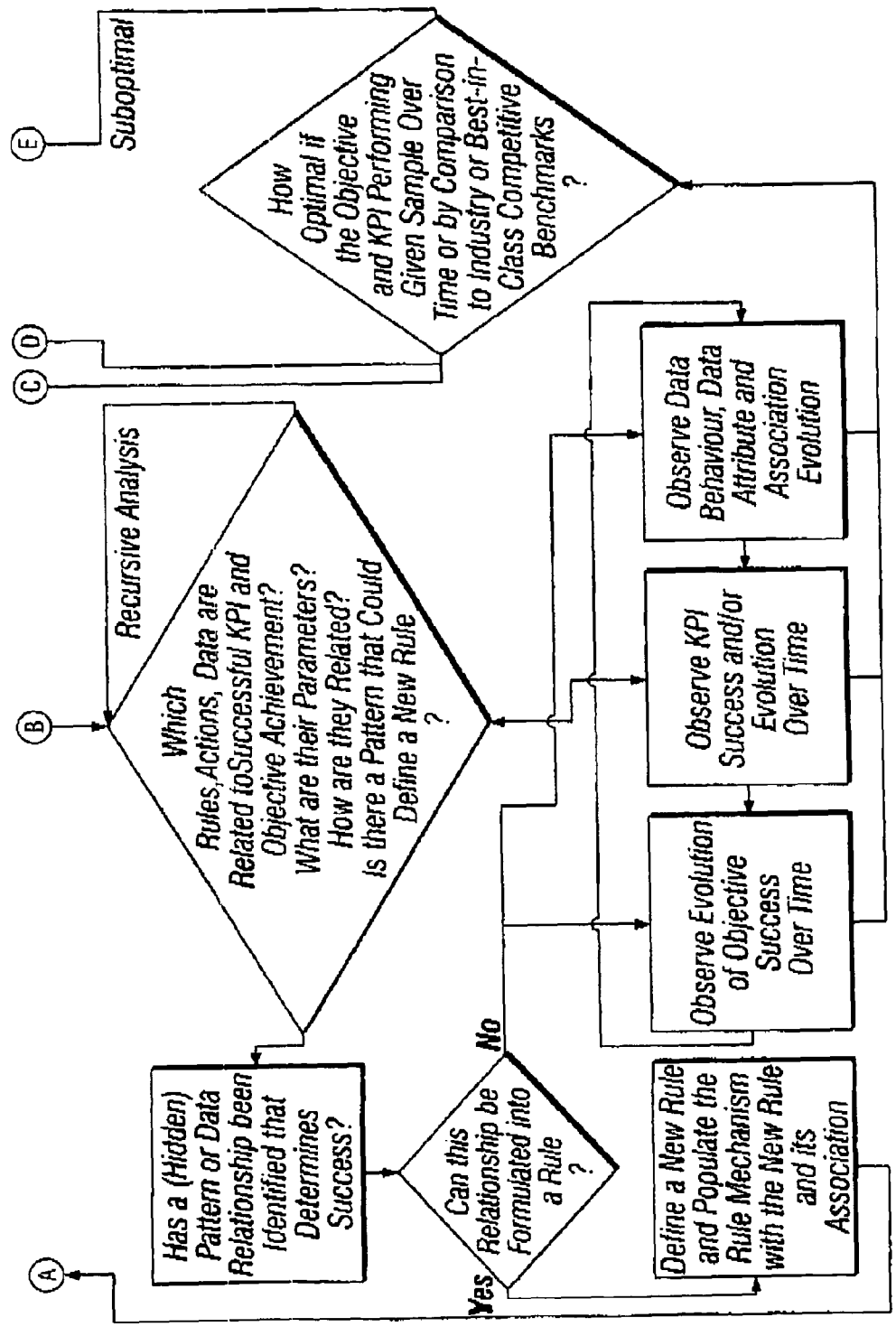

Rule and Parameter Layer 155 may be used to effect an initial or evolved KPI, rule and/or rule associated parameters, modify, reinforce, or maintain actions as well as analyze and evaluate the objectives, KPIs, rules, parameters and interdependence pattern evolution over time driving the adaptation of the AE's rule frameworks, e.g. the rules and parameters that govern the primary level optimization and success evaluation process and the action process. The secondary modification level may trigger the mapping of a new data interdependence map (e.g., generating a self-organizing mapping based on a correlation algorithm or a relationship weighting akin to synaptic weight algorithm when data relationships are identified). Moreover, when the AE "learns" over time as to what has been successful and what has not, it may also determine dataset interdependencies/interrelationships over time. FIGS. 8a and 8b depicts an example of a possible interaction of the secondary modification system 810 and the primary modification system 820. The primary modification system recursively processes each of objectives A, B, C, and N 830. The secondary modification system may consider the relationships, interdependence and correlation between the objectives taking into account the information gathered from the recursive actions of the primary modification system.

The use of meta-logic layers may be used to improve objectives and KPIs over time. Because of this, the AE may improve actions, decision-making, and support information provisions by adapting to new information. In light of the role of the secondary modification system of the AE, new data maps, templates, KPI relationships, and rules that govern dataset interdependence and interrelationships may be defined, redefined and put into effect 840. Through this procedure, global optimization 850 may be achieved.

Correlation and Learning System layer 165 (see FIG. 3), may include code to analyze an entire system after each iteration, or after multiple iterations. This permits dynamic global system analysis. The learning system layer may analyze the success of rule application after each iteration locally and globally. The learning system layer may apply Evolutionary Algorithms and Genetic Algorithms (GA) to ensure that rules applied by the modification system do not lead to rule and, subsequent, systemic canalization. The learning system layer may analyze cost-benefits of certain rules using utility functions and game theoretic approaches, analyzes SPC evolution over time, checks on the validity of Fuzzy Logic parameters, provide rule enforcement/discarding after global analysis, and rate the success of rules and decide on their utility.

Correlation and Learning System layer 165 may be divided into two layers, one as the primary learning system and another as the secondary learning system. The primary learning system may compare, analyze, and retain the modeled action outcome with the actual data feedback on the next iteration(s). It may feed modification requirements based on learning system analysis to the primary/secondary modification systems. It may also feed the secondary learning system as to pattern recognition.

Correlation and Learning System Layer 165, the relationships (hidden or otherwise), interdependencies and correlation analysis are explored between the various KPIs, filters, decision-making actions, actions, and/or the objective. Moreover, at this level, the AE may consider relationships and interdependence between the instant objective and other objectives and domains and their possible effect on the instant objective. The AE may also learn cause and effect relationships, for example, through correlation analysis. As a process or action moves from one state to another, events at different levels (primary, secondary, tertiary, etc.) impact the process flow. The AE adapts to its environment by learning to understand multi-layered cause and effect relationships that determine the effectiveness of a process to be performed. The AE system learns the options for influencing the process.

Correlation and Learning System layer 165 may be used to analyze pertinent successes of rule application by the system and guide the reinforcement of successful rules and the discarding of unsuccessful rules. Correlation and Learning System layer 165 may directly feed the secondary modification system with information. Correlation and Learning System layer 165 may perform utility and fitness analyses and may associate those with the use of algorithms. Since reinforcement may lead to undesired rule canalization, Correlation and Learning System layer 165 may also introduce genetic algorithms and provide those to the secondary modification system and check on their relative success. Effective learning may require a degree of experimentation to evolve successfully much like the human brain.

The AE system has the ability to modify rules and/or generated agents and evaluate those modifications based on subsequent outputs (e.g., results). In addition, the AE system may learn over time which rules and/or actions (with their associated parameters) will meet a defined KPI, as well as learn which KPIs (modified or otherwise) are best associated with a particular objective, and learn relationships/associations.

FIGS. 9a, 9b, 10a, 10b-1 and 10b-2 diagram some of the analytical processes and the progressive, reiterative nature, respectively, of the learning system. FIGS. 11a, 11b, 12a and 12b depict simplified exemplary views of the AE process. It is the AE's ability to learn that makes it a truly Cognitive System.

Figure 13A:
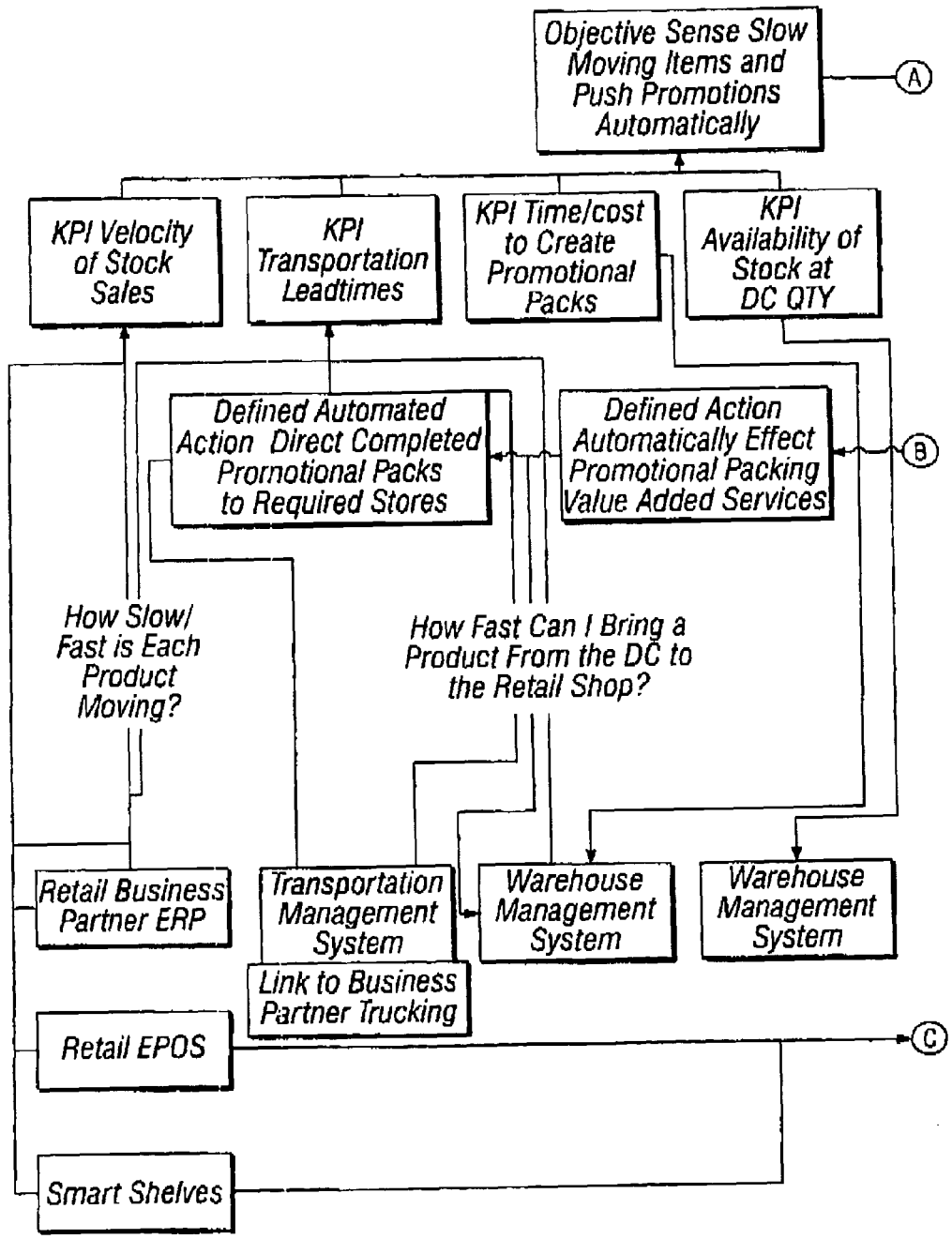
FIGS. 13a and 13b depict an exemplary use of an embodiment of an Agent Engine System.
Figure 13B:
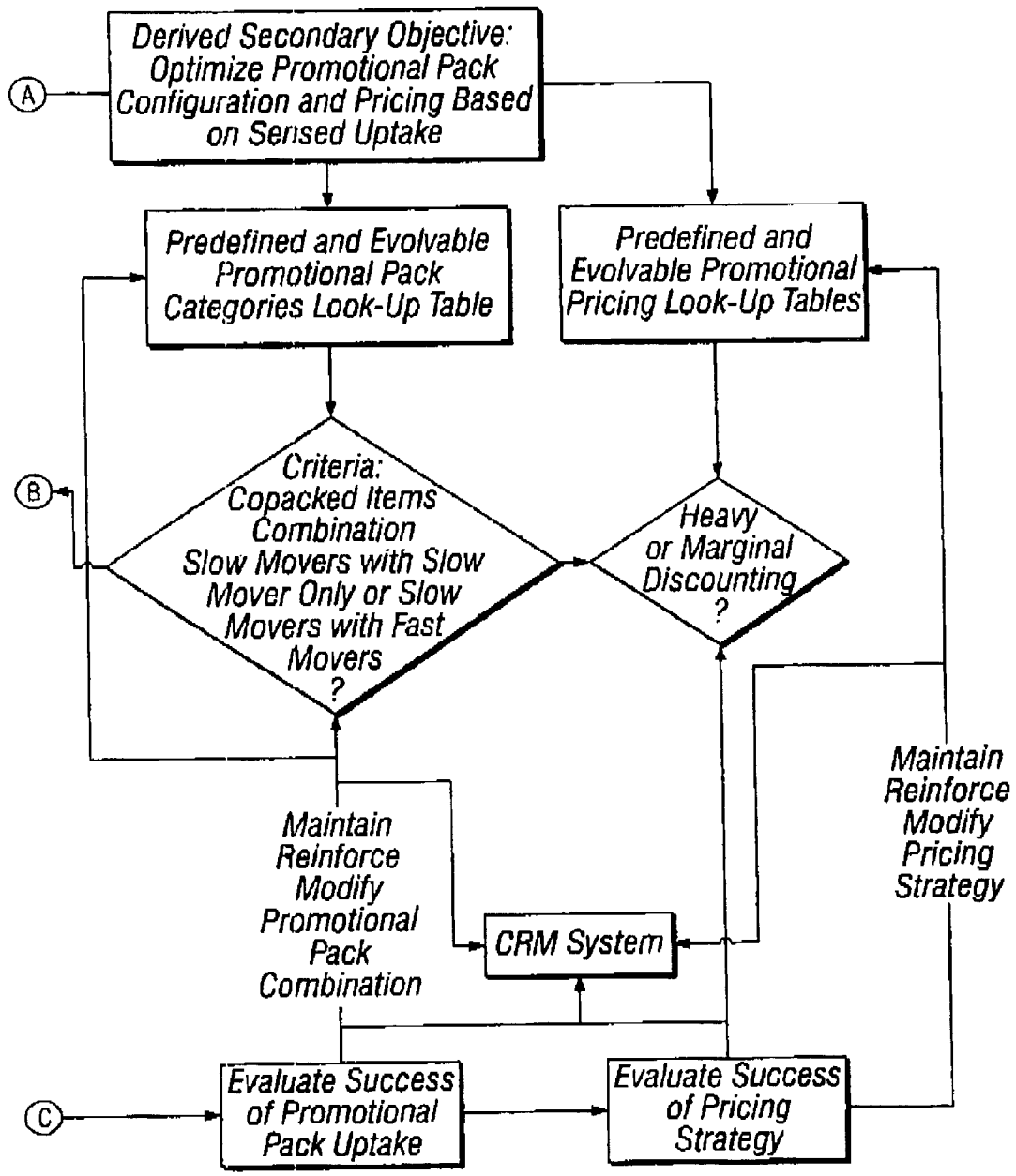

FIGS. 13a and 13b depicts an exemplary scenario use an AE system. In this example, the objective may be described as: "Fullfillment to Retail Stores—the automatic sensing of slow moving items and the automatic effecting of promotional pack configuration/pricing and delivery to store.

Table 7 shows an exemplary map for an AE infrastructure, including resources that may be used in the construction of the AE system.

The AE's Exemplary Functions and Commensurate Resources Used:

| Objective definition | Objective Evaluation | KPI definition | KPI evaluation |
|---|---|---|---|
| Templates | Fuzzy Logic | Templates | Fuzzy Logic |
| Wizard | SPC | Wizard | SPC |
| AE: evolved objective (optional) | Templates | AE: evolved KPI (optional) | Templates |
| AE: establishing, mapping and analysis of interdependent objectives) | Wizard | AE: establishing, mapping and analysis of interdependent KPIs) | Wizard |

-continued

| Filter | Rules (AE-evolvable) Analysis | Decision-making | Rules (AE-evolvable) Actioning |
|---|---|---|---|
| SPC | Utility Function | Utility Functions | Templates |
| Fuzzy Logic | Fuzzy Logic Analysis | Game Theoretic Algorithm | Wizard |
| Rules (AE-evolvable) | Comparative Analysis | Behavioral Learning Algorithm | User alerts |
| On/off switch for Fuzzy Logic and/or SPC and/or other rules | | Anticipatory Economic Agents | Rule and parameter maintenance, reinforcement, modification |
| Templates | Templates | Linear Optimization Algorithms | AE- evolvable parameters and rules |
| Wizard | Wizard | Non-Linear Optimization Algorithm | |

First level meta Layer responsible for recursive success, rule, parameter evaluation and adaptation

| | | | |
|---|---|---|---|
| Reinforcement learning algorithm | Action Rules (Thresholds, limits. Type of action etc) | Markov Decision Processes | Adaptive Logic Networks |
| Fuzzy Logic | Anticipatory Economic Agents performance analysis and evolution | Contextualization Algorithms Networks | Artificial Neural |
| Behavioral Algorithm to feed decision-making, analytics - performance analysis and evolution | Linear Optimization Algorithms | Maintenance, Reinforcement, Modification Rules | Relational database |
| Monte Carlo Simulation Model to learn initial conditions | Non-Linear Optimization Algorithm | Templates | Wizard |

Second level meta-layer responsible for learning and AE rule adaptation

| | | | |
|---|---|---|---|
| Adaptive Logic Networks | Linear Optimization Algorithms | Pattern Recognition Analysis Algorithms | |
| Artificial Neural Networks | Non-Linear Optimization Algorithm | Correlation Analysis Algorithms | |
| Cellular Automata or adaptation thereof | Monte Carlo Model | Contextualization Algorithms | |
| Reinforcement learning algorithm | Self-organizing Algorithms | Action Rules | |
| Genetic Algorithms | | Relational database | |

| | | |
|---|---|---|
| Evolutionary Learning Algorithms | Data mining Algorithms | Templates |
| Fuzzy Logic | Data mining, analysis and display of self-organizing maps to the user for information and Decision support | Wizard |
| Behavioral Algorithm to feed decision-making, analytics - performance analysis and evolution | Classification algorithms | Indexing and classification mechanism |
| Anticipatory Economic Agents performance analysis and evolution | Association Rule Algorithms | |

As describes above, an AE system may aggregate, link, analyze and improve real-time business data against strategic, tactical and operational KPIs in an integrated and automated evolutionary manner. For example, the AE system may highlight changes to strategic and tactical objectives based on sensed execution performance as well as satisfying strategic and tactical objectives b changing business process and operational execution rules.

The AE may be referred to as an intelligent business logic engine that adapts its own rules, KPIS, and parameters in light of new information. This new information may be supplied as additional data from the data source, inputs from a user, or generated by the AE's own processes.

The AE may validate the relative fitness of business operating parameters and associated business rules through success rating obtained by comparing local to global operating parameters, say operational to strategic objectives. It may also adapt to the changing business environment and prevent canalization of business processes.

The AE may elucidate business-operating parameters that are highly successful that may have been hidden in complex business environments and correlate those hidden relationships to form the basis of rule enforcement of multiple connected parameters.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An agent engine comprising:
    a definition component, the definition component to interactively collect user input to define an objective;
    a library storing a plurality of components including any one of executable code, rule-based filters, or object oriented programs; and
    an agent generator component implemented by a computer processor, the agent generator component to generate at least one agent that includes at least one of the plurality of components from the library, the at least one generated agent to autonomously perform a function related to the objective and produce at least one output; and
    a modification component to automatically modify a rule for the at least one agent based on an evaluation of the at least one output.

2. The agent engine of claim 1, further comprising:
    a data feed from a first generated agent to a second generated agent, the data feed to pass data produced by the first generated agent to the second generated agent, the passed data usable by the second generated agent to apply a learning algorithm to one of a rule or a data definition related to the objective.

3. The agent engine of claim 2, further comprising:
    a feedback loop to determine from the data feed whether the generated agent may be modified to improve performance.

4. The agent engine of claim 1, wherein the objective is a business objective.

5. The agent engine of claim 4, wherein the objective is an objective related to a business entity.

6. The agent engine of claim 4, wherein at least two agents are generated to perform the business objective.

7. The agent engine of claim 1, further comprises:
    a generated agent having at least one of a filter application, a data aggregator, an association application, an analyzer, a modeler, or an actuator.

8. The agent engine of claim 1, further comprises:
    a memory system, the memory system to store results produced from the generated agent.

9. The agent engine of claim 1,
    wherein the agent generator component defines a key performance indicator having a value or range of values.

10. The agent engine of claim 9, wherein the key performance indicator defines the data set for a generated agent, the data set associated with the objective.

11. The agent engine of claim 1, further comprising:
    a data correlation component to determine one of a modification and a reinforcement to at least one of a rule, an action, or a generated agent.

12. The agent engine of claim 1, wherein at least one generated agent includes executable code to modify at least one of a rule or a key performance indicator.

13. The agent engine of claim 12, wherein a modification to the generated agent is based in part on a comparison of results produced during different cycles of execution of the generated agent.

14. The agent engine of claim 1, further comprises:
    a fuzzy logic algorithm to evaluate a degree of completion of the generated agent.

15. The agent engine of claim 14, wherein evaluating a degree of completion comprises at least one of comparing different data sets, defining an absolute truth operation, defining a relative truth operation, or evolving a generated agent.

16. The agent engine of claim 1, wherein the definition component is to define a data set associated with the objective.

17. The agent engine of claim 1, wherein the one of the plurality of components included in the agent is selected based on the user input.

18. The agent engine of claim 1, wherein the definition component and the agent generator component are integrated into a definition wizard.

19. The agent engine of claim 1, wherein the agent generator component to generate a plurality of agents to achieve the objective and a first agent in the plurality of agents to route an output of the first agent to an input of a second agent in the plurality of agents.

20. The agent engine of claim 1, further comprising:
a sensor to sense and translate data through a data feed to the at least one agent.

21. The agent engine of claim 1, wherein the modification component to determine a secondary rule in response to the output unsuccessfully meeting the objective when the rule is used.

22. The agent engine of claim 1, wherein the modification component to analyze an effect of modifying the rule.

23. The agent engine of claim 1, wherein the modification component to determine a timeframe to adjust the rule based on a level of importance of the objective and a degree of satisfaction of the objective.

24. The agent engine of claim 1, the modification component to automatically modify the rule based on an empirically successful modification stored in memory.

25. An agent engine architecture system comprising:
a plurality of levels implemented by a computer processor at least one of the plurality of levels to generate at least one or more agents that execute a function to produce a result to satisfy an objective;
at least one of the plurality of levels associated with one of the at least one or more agents,
at least one of the plurality of levels to define the objective,
at least one key performance indicator (KPI) associated with the objective, and rules and parameters associated with the KPI;
at least one of the plurality of levels to filter, analyze, or act based upon a defined data set;
at least one of the plurality of levels to evaluate the result from another level and determine a degree to which the result satisfies the objective;
at least one of the plurality of levels to modify at least one of the KPI, or the at least one of the plurality of levels to learn and determine a modification to at least one of a rule or a generated agent and to automatically modify the rule for the at least one or more agents based on an evaluation of the result; and
at least one definition wizard to receive input to customize an operation within each of the plurality of levels.

26. The system of claim 25, wherein at least one of the plurality of levels comprises a learning system for determining whether modifications to the at least one rule and agent are successful and for modifying the system based on an output of the generated agent.

27. The system of claim 25, further comprising a library of preprogrammed components, the components including at least one of an objective, a KPI, an algorithm, a function or an object.

28. The system of claim 25, further comprising the definition wizard, the definition wizard to generate at least one of a data set or a preprogrammed component for the generated agent.

29. An agent engine system comprising:
a plurality of levels implemented by a computer processor, at least one of the plurality of levels to generate at least one or more agents that execute a function to produce an output to satisfy an objective,
at least one of the plurality of levels associated with one of the at least one or more agents,
a first of the plurality of levels to define the objective customized by interactive user input,
a second the plurality of levels to link at least one of a key performance indicator (KPI) associated with the objective, a rule, or an algorithm associated with the objective,
a third of the plurality of levels to receive the output from one of the plurality of levels and to automatically modify the rule for the at least one or more agents based on an evaluation of the output produced by the at least one or more agents.

30. The system of claim 29, wherein the second of the plurality of levels is further to filter, analyze, or act based upon a defined data set.

31. The system of claim 29, wherein the third of the plurality of levels is further to determine a degree to which the output satisfies the objective, and to modify at least one of the KPI, or the generated agent.

32. The system of claim 29, wherein the third of the plurality of levels is further to determine whether the modification to the one of the rule or the algorithm is successful.

33. The system of claim 29, further comprising a library of preprogrammed components, the components including at least one of an objective, a KPI, an algorithm, a function or an object.

34. The system of claim 29, wherein the first of the plurality of levels further comprises a definition wizard, the definition wizard to generate at least one of a data set or a preprogrammed component for the generated agent.

* * * * *

UNITED STATES PATENT AND TRADEMARK OFFICE
CERTIFICATE OF CORRECTION

| | | |
|---|---|---|
| PATENT NO. | : 7,711,670 B2 | Page 1 of 1 |
| APPLICATION NO. | : 10/328855 | |
| DATED | : May 4, 2010 | |
| INVENTOR(S) | : Roediger | |

It is certified that error appears in the above-identified patent and that said Letters Patent is hereby corrected as shown below:

In Column 27, Claim 25, after line 37 ending in "result satisfies the objective;" please insert --at least one of the plurality of levels to modify at least one of the KPI, or the at least one or more agents;--

Signed and Sealed this
Ninth Day of August, 2011

David J. Kappos
*Director of the United States Patent and Trademark Office*